United States Patent
Hensgen et al.

(10) Patent No.: US 11,356,507 B2
(45) Date of Patent: **\*Jun. 7, 2022**

(54) SYNCHRONIZING AN APPLICATION ON A COMPANION DEVICE

(71) Applicant: OpenTV, Inc., San Francisco, CA (US)

(72) Inventors: Debra Hensgen, San Jose, CA (US); Ludovic Pierre, Palo Alto, CA (US); Martin Gibson, San Francisco, CA (US); Nandini Iyer, Fremont, CA (US); Jean-Rene Menand, Los Altos, CA (US); Sebastian Rapport, Grass Valley, CA (US)

(73) Assignee: OPENTV. INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,860

(22) Filed: Nov. 20, 2020

(65) Prior Publication Data

US 2021/0144204 A1 May 13, 2021

Related U.S. Application Data

(63) Continuation of application No. 16/580,368, filed on Sep. 24, 2019, now Pat. No. 10,880,374, which is a
(Continued)

(51) Int. Cl.
*H04L 29/08* (2006.01)
*H04L 67/1095* (2022.01)
(Continued)

(52) U.S. Cl.
CPC ............ *H04L 67/1095* (2013.01); *G06F 9/00* (2013.01); *G06F 16/95* (2019.01);
(Continued)

(58) Field of Classification Search
CPC . G06F 9/00; G06F 16/95; G06F 16/27; H04L 12/2803; H04L 12/2814;
(Continued)

(56) References Cited

U.S. PATENT DOCUMENTS

| 8,171,137 B1 | 5/2012 | Parks et al. |
| 9,143,565 B2 | 9/2015 | Hensgen et al. |

(Continued)

FOREIGN PATENT DOCUMENTS

| CN | 101310472 | 11/2008 |
| CN | 102484887 | 5/2012 |

(Continued)

OTHER PUBLICATIONS

"Chinese Application Serial No. 201480042381.8, Decision of Reexamination dated Mar. 4, 2021", with machine English translation, 26 pages.
(Continued)

*Primary Examiner* — Le H Luu
(74) *Attorney, Agent, or Firm* — Schwegman Lundberg & Woessner, P.A.

(57) ABSTRACT

A media server machine may be configured to provide media content within a datastream. This datastream may be provided to a media device that is configured to present the media content on a display. Also, this datastream may contemporaneously contain an "app-sync indicator" for the media content. The app-sync indicator is a data structure that signals the media device to launch an application on a companion device. By providing the app-sync indicator contemporaneously with the media content in the datastream, the launching of the application on the companion device may be synchronized with the media content. The app-sync indicator may specify the application to be launched. Also, the app-sync indicator may specify supple-
(Continued)

mental content to be presented by the launched application on the companion device.

20 Claims, 12 Drawing Sheets

Related U.S. Application Data continuation of application No. 15/635,455, filed on Jun. 28, 2017, now Pat. No. 10,469,576, which is a continuation of application No. 14/832,986, filed on Aug. 21, 2015, now Pat. No. 9,723,076, which is a continuation of application No. 13/905,779, filed on May 30, 2013, now Pat. No. 9,143,565.

(51) Int. Cl.
| | |
|---|---|
| H04N 21/8547 | (2011.01) |
| G06F 16/95 | (2019.01) |
| H04L 65/401 | (2022.01) |
| H04L 65/612 | (2022.01) |
| H04L 65/1059 | (2022.01) |
| H04N 21/2362 | (2011.01) |
| H04N 21/41 | (2011.01) |
| H04N 21/858 | (2011.01) |
| H04L 12/28 | (2006.01) |
| H04N 21/436 | (2011.01) |
| H04N 21/235 | (2011.01) |
| H04N 21/43 | (2011.01) |
| G06F 9/00 | (2006.01) |
| H04L 65/00 | (2022.01) |
| H04W 8/00 | (2009.01) |
| H04N 21/242 | (2011.01) |
| H04N 21/8545 | (2011.01) |
| H04L 67/125 | (2022.01) |

(52) U.S. Cl.
CPC ...... *H04L 12/2803* (2013.01); *H04L 12/2814* (2013.01); *H04L 12/2834* (2013.01); *H04L 65/00* (2013.01); *H04L 65/1059* (2013.01); *H04L 65/4015* (2013.01); *H04L 65/4084* (2013.01); *H04L 67/125* (2013.01); *H04N 21/235* (2013.01); *H04N 21/2362* (2013.01); *H04N 21/242* (2013.01); *H04N 21/4126* (2013.01); *H04N 21/4307* (2013.01); *H04N 21/43615* (2013.01); *H04N 21/8545* (2013.01); *H04N 21/8547* (2013.01); *H04N 21/8586* (2013.01); *H04W 8/005* (2013.01); *H04L 2012/2849* (2013.01)

(58) Field of Classification Search
CPC . H04L 12/2834; H04L 65/00; H04L 65/1059; H04L 65/4015; H04L 65/4084; H04L 67/1095; H04L 67/125; H04L 2012/2849; H04L 12/1822; H04N 21/235; H04N 21/2362; H04N 21/242; H04N 21/4126; H04N 21/4307; H04N 21/43615; H04N 21/439; H04N 21/8547; H04N 5/932; H04W 4/21

See application file for complete search history.

(56) References Cited

U.S. PATENT DOCUMENTS

| 9,723,076 B2 | 8/2017 | Hensgen et al. |
| 10,469,576 B2 | 11/2019 | Hensgen et al. |
| 10,880,374 B2 | 12/2020 | Hensgen et al. |
| 2002/0162120 A1 | 10/2002 | Mitchell |
| 2007/0033652 A1 | 2/2007 | Sherwani et al. |
| 2010/0222102 A1 | 9/2010 | Rodriguez |
| 2011/0016172 A1* | 1/2011 | Shah ................ H04N 21/439 709/203 |
| 2011/0131332 A1 | 6/2011 | Bouazizi |
| 2011/0320627 A1 | 12/2011 | Landow et al. |
| 2012/0001155 A1 | 1/2012 | Thompson et al. |
| 2012/0002111 A1 | 1/2012 | Sandoval et al. |
| 2012/0011550 A1 | 1/2012 | Holland |
| 2012/0081268 A1 | 4/2012 | Sirpal et al. |
| 2012/0081607 A1 | 4/2012 | Kitazato |
| 2012/0084681 A1 | 4/2012 | Cassar |
| 2012/0089923 A1 | 4/2012 | Pettit et al. |
| 2012/0174158 A1 | 7/2012 | Mowrey et al. |
| 2012/0210349 A1 | 8/2012 | Campana et al. |
| 2012/0249424 A1 | 10/2012 | Bove et al. |
| 2012/0311074 A1 | 12/2012 | Arini et al. |
| 2013/0061267 A1 | 3/2013 | Cansino et al. |
| 2013/0198642 A1 | 8/2013 | Carney et al. |
| 2013/0251329 A1* | 9/2013 | McCoy ................ H04N 5/932 386/201 |
| 2014/0068681 A1* | 3/2014 | Lemmey ............. H04L 12/1822 725/74 |
| 2014/0129570 A1* | 5/2014 | Johnson ............. H04N 21/4788 707/748 |
| 2014/0213227 A1* | 7/2014 | Rao .......................... H04W 4/21 455/414.3 |
| 2014/0259081 A1* | 9/2014 | Chatterjee ........ H04N 21/43615 725/81 |
| 2014/0279889 A1* | 9/2014 | Luna ....................... G06F 16/27 707/626 |
| 2014/0359057 A1 | 12/2014 | Hensgen et al. |
| 2016/0044104 A1 | 2/2016 | Hensgen et al. |
| 2017/0339226 A1 | 11/2017 | Hensgen et al. |
| 2020/0162548 A1 | 5/2020 | Hensgen et al. |

FOREIGN PATENT DOCUMENTS

| CN | 103119956 | 5/2013 |
| CN | 105432087 | 3/2016 |
| CN | 105432087 B | 8/2021 |
| EP | 2494541 | 9/2012 |
| EP | 3005693 | 7/2020 |
| JP | 2005159592 | 6/2005 |
| JP | 2011166441 | 8/2011 |
| JP | 2012244339 | 12/2012 |
| JP | 2013066159 | 4/2013 |
| KR | 20080026132 | 3/2008 |
| KR | 20080056588 | 6/2008 |
| KR | 20090043976 | 5/2009 |
| WO | 2010136866 | 12/2010 |
| WO | 2011153044 | 12/2011 |
| WO | 2012043353 | 4/2012 |
| WO | 2012092247 | 7/2012 |
| WO | 2012120524 | 9/2012 |
| WO | 2012173060 | 12/2012 |
| WO | 2013028578 | 2/2013 |
| WO | 2014194126 | 12/2014 |

OTHER PUBLICATIONS

"Korean Application Serial No. 10-2015-7037107, Response filed Feb. 3, 2021 to Notice of Preliminary Rejection dated Dec. 3, 2020", with machine English translation, 7 pages.
"Canadian Application Serial No. 2,913,542, Office Action dated Apr. 13, 2021", 3 pgs.
"Dial—FAQ", [Online] Retrieved from the Internet: URL: http: www.dial-multiscreen.org faq, (Accessed Apr. 16, 2013), 2 pgs.
"International Application Serial No. PCT US2014 040075, International Search Report dated Oct. 10, 2014", 2 pgs.
"International Application Serial No. PCT US2014 040075, Written Opinion dated Oct. 10, 2014", 7 pgs.
"U.S. Appl. No. 13/905,779, Non Final Office Action dated Mar. 18, 2015", 6 pgs.
"International Application Serial No. PCT US2014 040075, International Preliminary Report on Patentability dated Apr. 15, 2015", 6 pgs.

(56) References Cited

OTHER PUBLICATIONS

"U.S. Appl. No. 13/905,779, Response filed Jun. 16, 2015 to Non Final Office Action dated Mar. 18, 2015", 20 pgs.
"U.S. Appl. No. 13/905,779, Notice of Allowance dated Jul. 15, 2015", 5 pgs.
"U.S. Appl. No. 14/832,986, Preliminary Amendment filed Oct. 28, 2015", 10 pgs.
"International Application Serial No. PCT US2014 040075, International Preliminary Report on Patentability dated Dec. 10, 2015", 9 pgs.
"Application Serial No. Examiner Interview Summary dated May 4, 2015", 3 pgs.
"International Application Serial No. PCT US2014 040075, Response filed Mar. 16, 2015 to Written Opinion dated Oct. 10, 2014", 6 pgs.
"European Application Serial No. 14804322.7, Response filed Jul. 22, 2016 to Communication pursuant to Rules 161(1) and 162 EPC dated Jan. 13, 2016", 21 pgs.
"U.S. Appl. No. 14/832,986, Non Final Office Action dated Oct. 6, 2016", 6 pgs.
"European Application Serial No. 14804322.7, Extended European Search Report dated Nov. 28, 2016", 7 pgs.
"U.S. Appl. No. 14/832,986, Response filed Feb. 28, 2017 to Non Final Office Action dated Oct. 6, 2016", 10 pgs.
"U.S. Appl. No. 14/832,986, Notice of Allowance dated Apr. 10, 2017", 7 pgs.
"European Application Serial No. 14804322.7, Response filed Jun. 15, 2017 to Extended European Search Report dated Nov. 28, 2016", 19 pgs.
"U.S. Appl. No. 15/635,455, Preliminary Amendment filed Aug. 10, 2017", 10 pgs.
"European Application Serial No. 14804322.7, Communication Pursuant to Article 94(3) EPC dated Aug. 9, 2017", 4 pgs.
"Chinese Application Serial No. 201480042381.8, Office Action dated Jan. 29, 2018", w English Translation, 26 pages.
"Japanese Application Serial No. 2016-516829, Office Action dated Mar. 13, 2018", w English translation, 13 pgs.
"Chinese Application Serial No. 201480042381.8, Respone filed Jun. 19, 2018 to Office Action dated Jan. 29, 2018", W English Claims, 95 pgs.
"Chinese Application Serial No. 201480042381.8, Office Action dated Oct. 9, 2018", (w English Translation), 35 pages.
"Japanese Application Serial No. 2016-516829, Response filed Aug. 10, 2018 to Office Action dated Mar. 13, 2018", (w English Claims), 15 pages.
"Japanese Application Serial No. 2016-516829, Examiners Decision of Final Refusal dated Dec. 4, 2018", (w English Translation), 6 pages.
"Chinese Application Serial No. 201480042381.8, Response filed Dec. 21, 2018 to Office Action dated Oct. 9, 2018", (w English Claims), 97 pages.
"U.S. Appl. No. 15/635,455, Non Final Office Action dated Jan. 25, 2019", 6 pgs.
"Chinese Application Serial No. 201480042381.8 Office Action dated Apr. 1, 2019", w English translation, 43 pgs.
"U.S. Appl. No. 15/635,455, Response filed May 23, 2019 to Non Final Office Action dated Jan. 25, 2019", 11 pgs.
"U.S. Appl. No. 15/635,455, Examiner Interview Summary dated May 28, 2019", 3 pgs.
"U.S. Appl. No. 15/635,455, Notice of Allowance dated Jun. 26, 2019", 7 pgs.
"Chinese Application Serial No. 201480042381.8, Response filed Aug. 5, 2019 to Office Action dated Apr. 1, 2019", w English claims, 96 pgs.
"Chinese Application Serial No. 201480042381.8, Decision of Rejection dated Nov. 4, 2019", 20 pages (12 pages official copy and 8 pages English translation).
"U.S. Appl. No. 16/580,368, Preliminary Amendment filed Mar. 10, 2020", 8 pgs.
"Korean Application Serial No. 10-2015-7037107, Notice of Preliminary Rejection dated May 18, 2020", w English Translation, 21 pgs.
"U.S. Appl. No. 16/580,368, Non Final Office Action dated Jun. 12, 2020", 6 pgs.
"Brazilian Application Serial No. BR1120150300766, Office Action dated Jun. 9, 2020", w English Translation, 7 pgs.
"Chinese Application Serial No. 201480042381.8, Notice of Reexamination dated Jun. 29, 2020", w English Machine Translation, 21 pgs.
"Canadian Application Serial No. 2,913,542, Office Action dated Jul. 7, 2020", 4 pgs.
"U.S. Appl. No. 16/580,368, Response filed Aug. 12, 2020 to Non Final Office Action dated Jun. 12, 2020", 8 pgs.
"Korean Application Serial No. 10-2015-7037107, Response filed Aug. 18, 2020 to Notice of Preliminary Rejection dated May 18, 2020", w English Claims, 37 pgs.
"U.S. Appl. No. 16/580,368, Notice of Allowance dated Aug. 26, 2020", 7 pgs.
"Brazilian Application Serial No. BR1120150300766, Response filed Sep. 10, 2020 to Office Action dated Jun. 9, 2020", with English translation, 97 pages.
"U.S. Appl. No. 16/580,368, Supplemental Notice of Allowability dated Oct. 9, 2020", 2 pgs.
"Chinese Application Serial No. 201480042381.8, Office Action dated Oct. 27, 2020", with English translation, 21 pages.
"U.S. Appl. No. 16/580,368, Supplemental Notice of Allowability dated Nov. 16, 2020", 2 pgs.
"Canadian Application Serial No. 2,913,542, Response filed Nov. 9, 2020 to Office Action dated Jul. 7, 2020", 32 pages.
"Korean Application Serial No. 10-2015-7037107, Notice of Preliminary Rejection dated Dec. 3, 2020", with English translation, 4 pages.
"Chinese Application Serial No. 201480042381.8, Response filed Dec. 11, 2020 to Office Action dated Oct. 27, 2020", with English claims, 97 pages.
"Canadian Application Serial No. 2,913,542, Response filed Jul. 14, 2021 to Office Action dated Apr. 13, 2021", w/ English Claims, 75 pgs.

* cited by examiner

SYNCHRONIZING AN APPLICATION ON A COMPANION DEVICE

CROSS REFERENCE TO RELATED APPLICATIONS

This application is a continuation of U.S. patent application Ser. No. 16/580,368, filed on Sep. 24, 2019, which is a continuation of U.S. patent application Ser. No. 15/635,455, filed on Jun. 28, 2017, which is a continuation of U.S. patent application Ser. No. 14/832,986, filed on Aug. 21, 2015, which is a continuation of U.S. patent application Ser. No. 13/905,779, filed on May 30, 2013, which applications are incorporated herein by reference in their entireties.

TECHNICAL FIELD

The subject matter disclosed herein generally relates to the processing of data. Specifically, the present disclosure addresses systems and methods to synchronize an application on a companion device.

BACKGROUND

Media content may be transmitted over a network (e.g., a cable television network, the Internet, or a satellite television network) and received by a media device that is communicatively coupled (e.g., by a wired or wireless connection) to a display. For example, media content in the example form of a television show or sports event may be multiplexed into a transport stream and broadcast via the network to one or more media devices within users' homes. Examples of such media devices include integrated receiver-decoders (IRDs), personal video recorders (PVRs), and other set-top boxes (STBs) that may be connected to a display (e.g., a television screen, a video monitor, or other suitable display device). Such media devices may be configured to present (e.g., display) the media content on the display.

BRIEF DESCRIPTION OF THE DRAWINGS

Some embodiments are illustrated by way of example and not limitation in the figures of the accompanying drawings.

DETAILED DESCRIPTION

Figure 1:
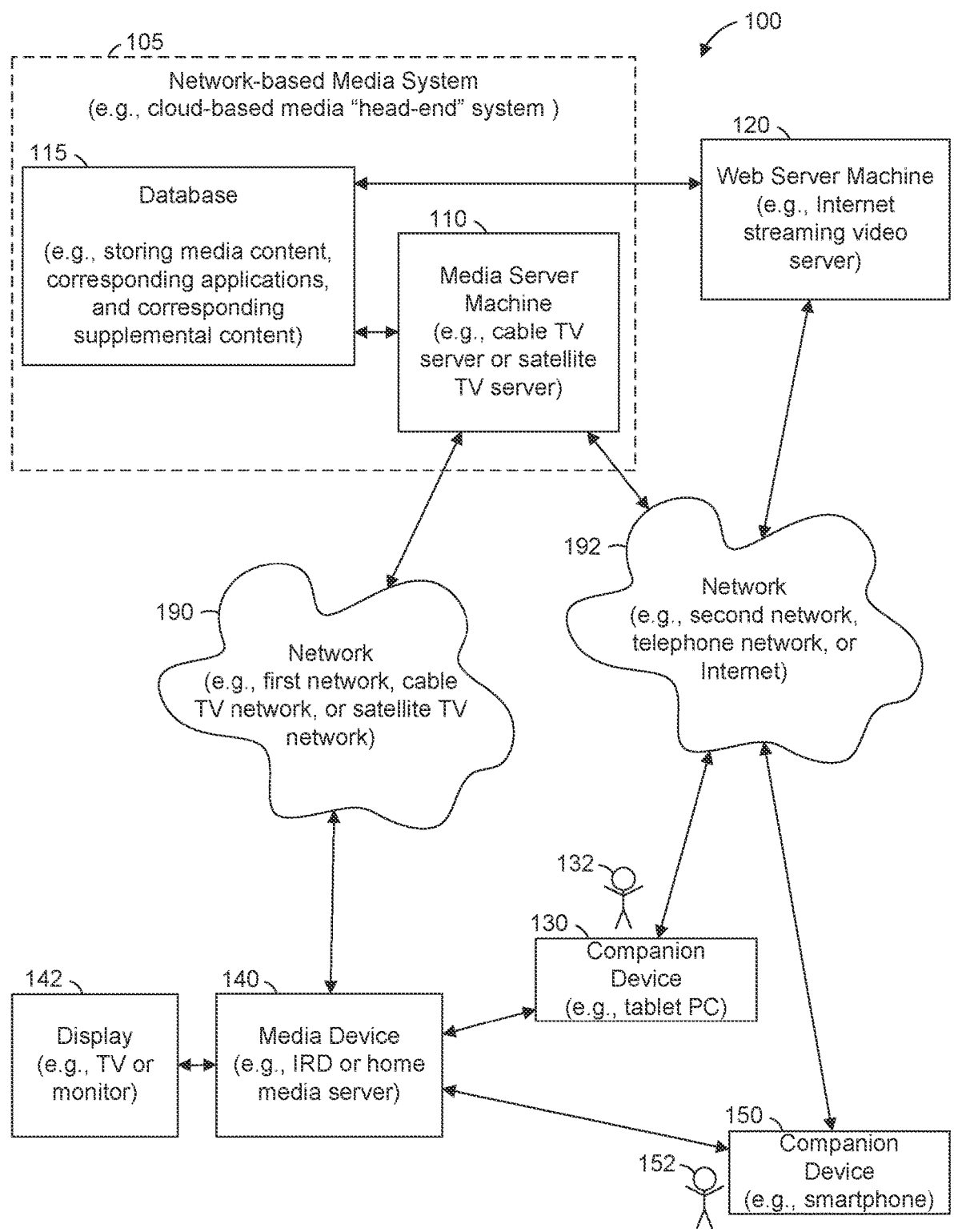
FIG. 1 is a network diagram illustrating a network environment suitable for synchronizing an application on a companion device, according to some example embodiments.

Example methods and systems are directed to synchronization of an application on a companion device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A media server machine (e.g., a computer system or other processing device) may be configured (e.g., by one or more software modules) to provide media content within a datastream. This datastream may be provided to a media device that is configured to present the media content on a display (e.g., a primary display). Also, this datastream may contain (e.g., contemporaneously) an "app-sync indicator" for the media content (e.g., an app-sync indicator that corresponds to the media content). The app-sync indicator is a data structure that signals the media device to launch an application on a companion device (e.g., a tablet computer or smart phone operable present additional content on a secondary display). By providing the app-sync indicator with the media content (e.g., contemporaneously) in the datastream, the launching of the application on the companion device may be synchronized with the media content.

For example, the datastream may be a multiplexed transport stream within which the media content is contained within a program stream, and the app-sync indicator may take the form of a table (e.g., an application information table (AIT) or other table) that is also multiplexed (e.g., as carousel data) into the same transport stream, same program stream, or both. This table, after being received by the media device, may cause the media device to generate and send a launch instruction to the companion device. The launch instruction, after being received by the companion device, may cause the companion device to launch an application (e.g., begin executing the application) while the media content is being presented on the display by the media device.

The app-sync indicator may specify the application (e.g., a mobile app) to be launched. Also, the app-sync indicator may specify supplemental content to be presented by the launched application. For example, the app-sync indicator may specify that a web browser be launched with a particular uniform resource identifier (URI) (e.g., a uniform resource locator (URL)) as input, so that the web browser presents supplemental content identified by that particular URI. As another example, supposing the media content is a sports event (e.g., a baseball game in which a particular team is playing), the app-sync indicator may specify that a mobile app (e.g., corresponding to the particular team) be launched to present supplemental content that corresponds to the sports event (e.g., information about individual players on that particular baseball team). As a further example, where the media content is a sports event, (e.g., a football game), the app-sync indicator may specify that a web browser or app be launched to present supplemental content in the form of streaming video that depicts an alternate camera angle (e.g., different from a primary camera angle depicted in the media content). Accordingly, the supplemental content may be pertinent to the media content, may correspond to the media content, and may reference the media content, while yet being separate, distinct, independent, and different from the media content. Additional details of various example embodiments are discussed below.

FIG. 1 is a network diagram illustrating a network environment 100, according to some example embodiments. The network environment 100 includes a media server machine 110, a database 115, a web server machine 120, a media device 140, and companion devices 130 and 150. The media server machine 110 and the media device 140 may be communicatively coupled to each other via a network 190 (e.g., a cable television network, satellite television network, the Internet, a cellular telephone network, any other network capable of communicating digital data, or any suitable combination of networks). The companion devices 130 and 150 may each be communicatively coupled to the media server machine 110, the web server machine 120, or both, by another network 192 (e.g., a telephone network, a cellular network, a cable Internet network, a local area network (LAN), a wide area network (WAN), or any suitable combination thereof). In addition, one or both of the companion devices 130 and 150 may be communicatively coupled to the media device 140 (e.g., by an infrared (IR) or wireless peer-to-peer LAN, or other suitable connection).

As noted in FIG. 1, the media server machine 110 may be or include a cable television server, satellite television service, or both. The database 115 may store media content (e.g., movies, television shows, sports events, educational programs, newscasts, or portions thereof, such as individual scenes, clips, cuts, or frames of such media content), applications (e.g., mobile app) that may correspond to media content, supplemental content for media content, or any suitable combination thereof. The media server machine 110, with or without the database 115 may form all or part of a network-based media system 105 (e.g., a cloud-based media "head end" system). In some example embodiments, the network-based media system also includes the web server machine 120.

The web server machine 120 may be or include an Internet streaming video server (e.g., configured to provide supplemental content in the form of on-demand video, such as, alternate camera angles that complement media content). The media device 140 may be or include an IRD or other STB suitable for presenting media content on the display 142 (e.g., a television, display screen, or other video-capable monitor), which may be communicatively coupled (e.g., by a wired or wireless connection) to the media device 140. In some example embodiments, the media device 140 is or includes a home media server computer. One or both of the companion devices 130 and 150 may be or include a tablet computer, a smart phone, a laptop computer, an e-book reader, or any suitable combination thereof. The media server machine 110, the database 115, the web server machine 120, the media device 140, and the companion devices 130 and 150 may each be implemented in a computer system, in whole or in part, as described below with respect to FIG. 12.

Also shown in FIG. 1 are users 132 and 152. One or both of the users 132 and 152 may be a human user (e.g., a human being), a machine user (e.g., a computer configured by a software program to interact with the companion device 130), or any suitable combination thereof (e.g., a human assisted by a machine or a machine supervised by a human). The user 132 is not part of the network environment 100, but is associated with the companion device 130 and may be a user of the companion device 130. For example, the companion device 130 may be a desktop computer, a vehicle computer, a tablet computer, a navigational device, a portable media device, or a smart phone belonging to the user 132. Likewise, the user 152 is not part of the network environment 100, but is associated with the companion device 150. As an example, the companion device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 and the network 192 each may be a network that enables communication between or among machines, databases, and devices (e.g., the media server machine 110 and the companion device 130). Accordingly, one or both of the network 190 and 192 may be a wired network, a wireless network (e.g., a mobile or cellular network), or any suitable combination thereof. One or both of the networks 190 and 192 may include one or more portions that constitute a private network, a public network (e.g., the Internet), or any suitable combination thereof. In some example embodiments, the networks 190 and 192 are combined into a single network. In certain example embodiments, the companion devices 130 and 150 are connected to the web server machine 120 by separate networks.

Figure 2:
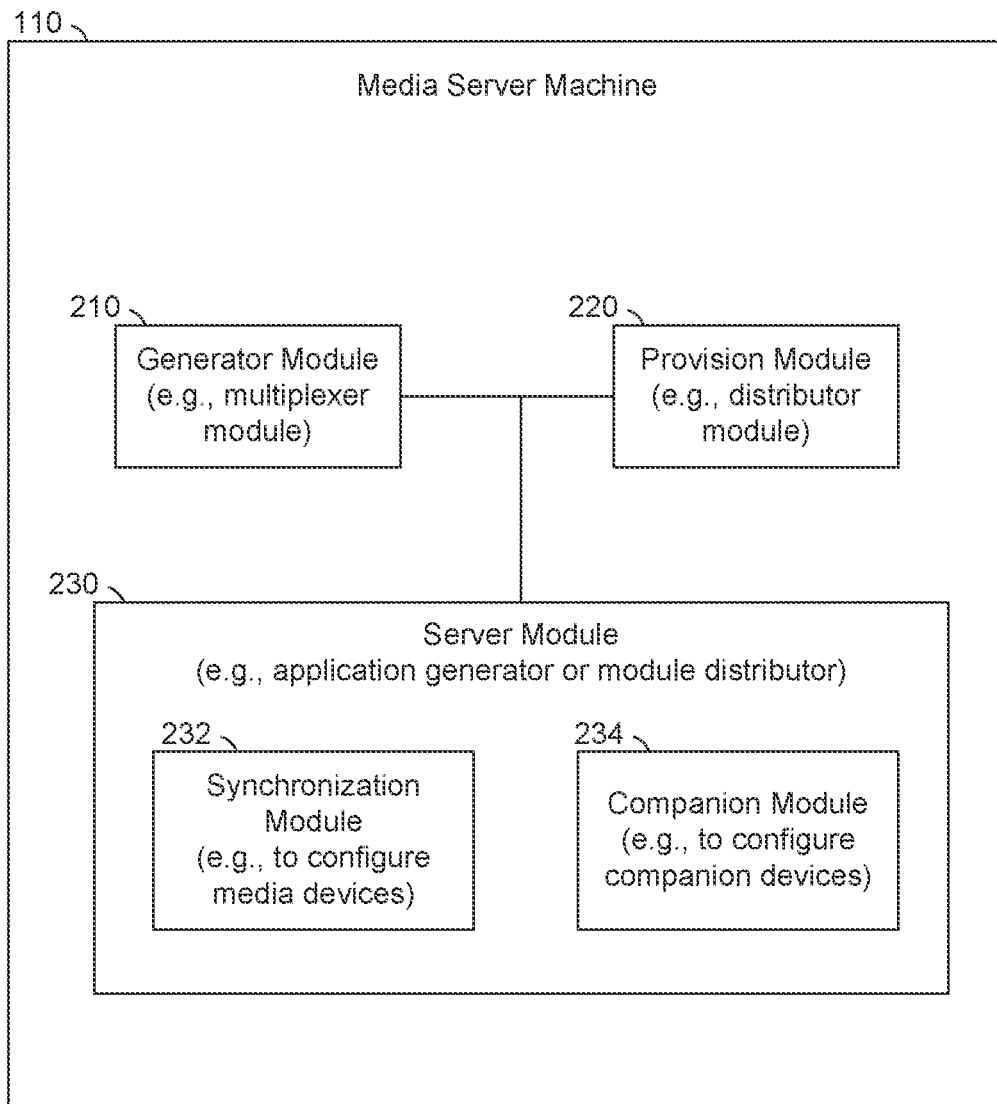
FIG. 2 is a block diagram illustrating components of a media server machine suitable for synchronizing the application on the companion device, according to some example embodiments.

FIG. 2 is a block diagram illustrating components of the media server machine 110, according to some example embodiments. The media server machine 110 is shown as including a generator module 210, a provision module 220, and a server module 230, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The generator module 210 may be or include a multiplexer module (e.g., configured to generate a datastream by multiplexing data such as various media content, one or more applications executable by the companion module 130, and one or more app-sync indicators). The provision module 220 may be or include a distributor module (e.g., configured to provide the datastream by distributing the datastream to various media devices, including the media device 140).

In some example embodiments, the media server machine 110 includes a server module 230 (e.g., in the form of an application generator, a module distributor, or both). The server module 230 may generate one or more software modules, and store them before providing one or more of them to a device (e.g., media device 140 or companion device 130). In the example shown in FIG. 2, the server module 230 is storing a synchronization module 232, as well as a companion module 234. The synchronization module 232 may be usable to configure one or more media devices (e.g., media device 140). The companion module 234 may be usable to configure one or more companion devices (e.g., companion device 130). The server module 230 may generate, store, and provide one or both of the synchronization module 232 and the companion module 234. For example, the synchronization module 232 may be provided to the media device 140, and the companion module 234 may be provided to one or both of the companion devices 130 and 150.

Certain example embodiments of the media device 140 support an automatic device discovery feature (e.g., for automatically detecting one or more companion devices). When a new person bearing new companion device enters a room during an activity that involves media content being presented on the display 142 (e.g., during gameplay of the game), the new person may be invited (e.g., automatically or manually) to join the existing activity (e.g., the game), based on the new companion device being automatically detected by the media device 140. The joining of the person to the activity may also be automatic. Alternatively, non-automatic joining of the person may be configured, for example, by implementing an authorization step such that an authorization to add the new person is obtained (e.g., by the media device 140, from the media server 110, the database 115, or the web server machine 120) prior to joining the new person to the activity. This feature may be useful in a dynamic local audience multi-player scenario (e.g., during media events). This feature may be implemented, wholly or partially, using the Discovery And Launch (DIAL) protocol by Netflix, Inc., using another protocol, or using any suitable combination of protocols.

According to some example embodiments, the synchronization module 232, the companion module 234, or both, may be or include a DIAL server (e.g., a server application that supports the DIAL protocol by Netflix, Inc.), a DIAL client (e.g., a client application that supports the DIAL protocol), or both. The synchronization module 232, the companion module 234, or both, may also be or include a Representational State Transfer (REST) server, REST client, or both.

In some example embodiments, the server module 230 is or includes an event signaling generator. In such example embodiments, the server module 230 is configured to generate one or more synchronization signals (e.g., metadata similar to an AIT) that are usable by the media device 140 to initiate one or more additional actions (e.g., beyond sending launch instructions) that cause the companion device 130 to perform one or more further actions. Such synchronization signals may be provided to the media device 140 in the datastream (e.g., contemporaneously with media content and a corresponding app-sync indicator). This may have the effect of causing the companion device 130 to perform such further actions at the appropriate time in synchronization with the media content.

In certain example embodiments, the server module 230 is configured to generate and distribute one or more upgrades for the media device 140, the companion device 130, or both (e.g., upgrades to the synchronization module 232, the companion module 234, an operating system, middleware, or any suitable combination thereof).

Figure 3:
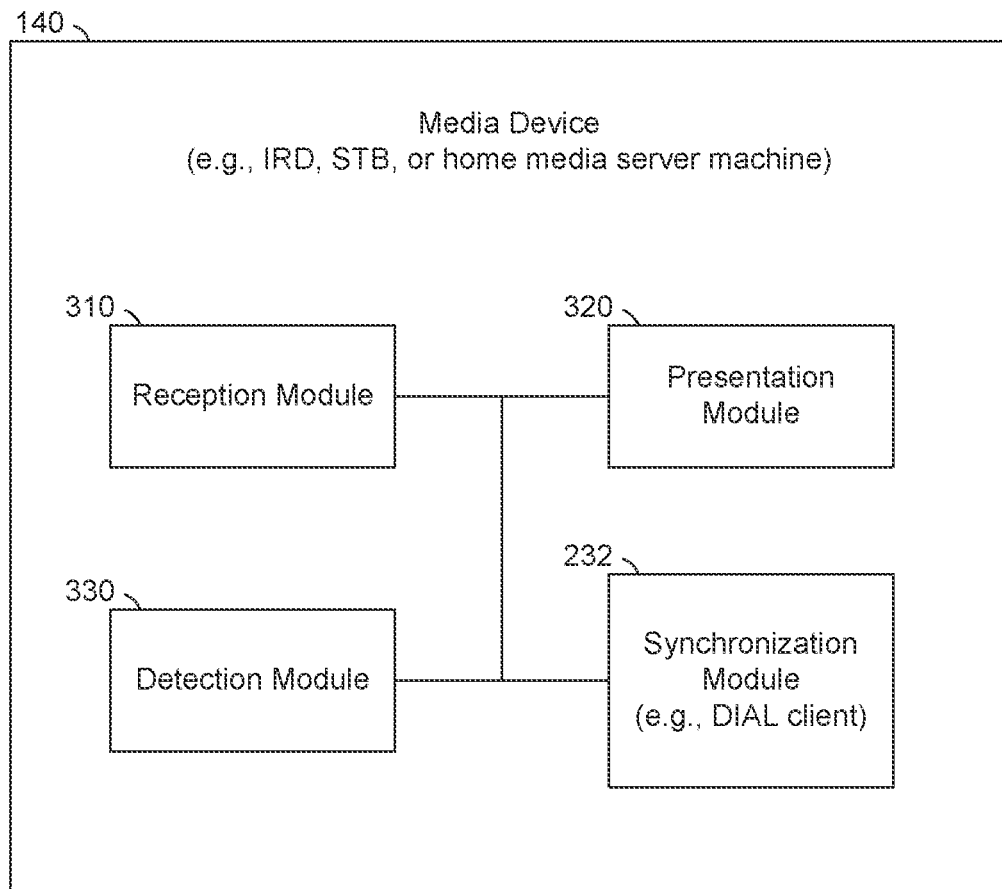
FIG. 3 is a block diagram illustrating components of a media device suitable for synchronizing the application on the companion device, according to some example embodiments.

FIG. 3 is a block diagram illustrating components of the media device 140, according to some example embodiments. The media device 140 is shown as including a reception module 310, a presentation module 320, a detection module 330, and the synchronization module 232 (e.g., generated and provided by the media server machine 110), all configured to communicate with each other (e.g., via a bus, shared memory, or a switch). As noted above, any one or more of these modules may be implemented using hardware (e.g., a processor of a machine), and any module described herein may configure a processor to perform the operations described herein for that module.

The reception module 310 is configured to receive the datastream provided by the media server machine 110 (e.g., from its provision module 220). The presentation module 320 is be configured to extract the media content from the datastream and present the media content on the display 142. The detection module 330 is configured to detect one or more companion devices (e.g., companion device 130) being moved (e.g., by the user 132) to within physical proximity of the media device 140, for example, being moved within a threshold distance of the media device 140 (e.g., within IR signal range, within wireless networking range, or within a predetermined distance as determined by geolocation techniques, such as by use of global positioning system (GPS) data) and establish one or more communication links with such detected companion devices. In some example embodiments, the server module 230 of the media server machine 110 generates the detection module 330, provides the detection module 330 to the media device 140, or both.

The synchronization module 232 may be or include a DIAL client (e.g., configured to launch one or more applications on the companion device 130, which may implement a DIAL server), and the synchronization module 232 may be configured to generate and send a launch instruction to one or more companion devices (e.g., companion devices 130 and 150). Such a launch instruction may be generated, sent, or both, based on an app-sync indicator provided (e.g., contemporaneously) with media content within a datastream from the media server machine 110. For example, the launch instruction may be generated and sent in response to the fact that the app-sync indicator is provided (e.g., contemporaneously) with the media content. The launch instruction may specify an application to be launched, supplemental content to be presented by the application, or both. In some example embodiments, the synchronization module 232 forms all or part of an application that is stored by the media device 140 and launched (e.g., executed) by the media device 140 (e.g., in response to the presence of the app-sync indicator in the datastream, in response to detection of one or more companion devices, in response to accessing the datastream, in response to user input, or any suitable combination thereof).

Figure 4:
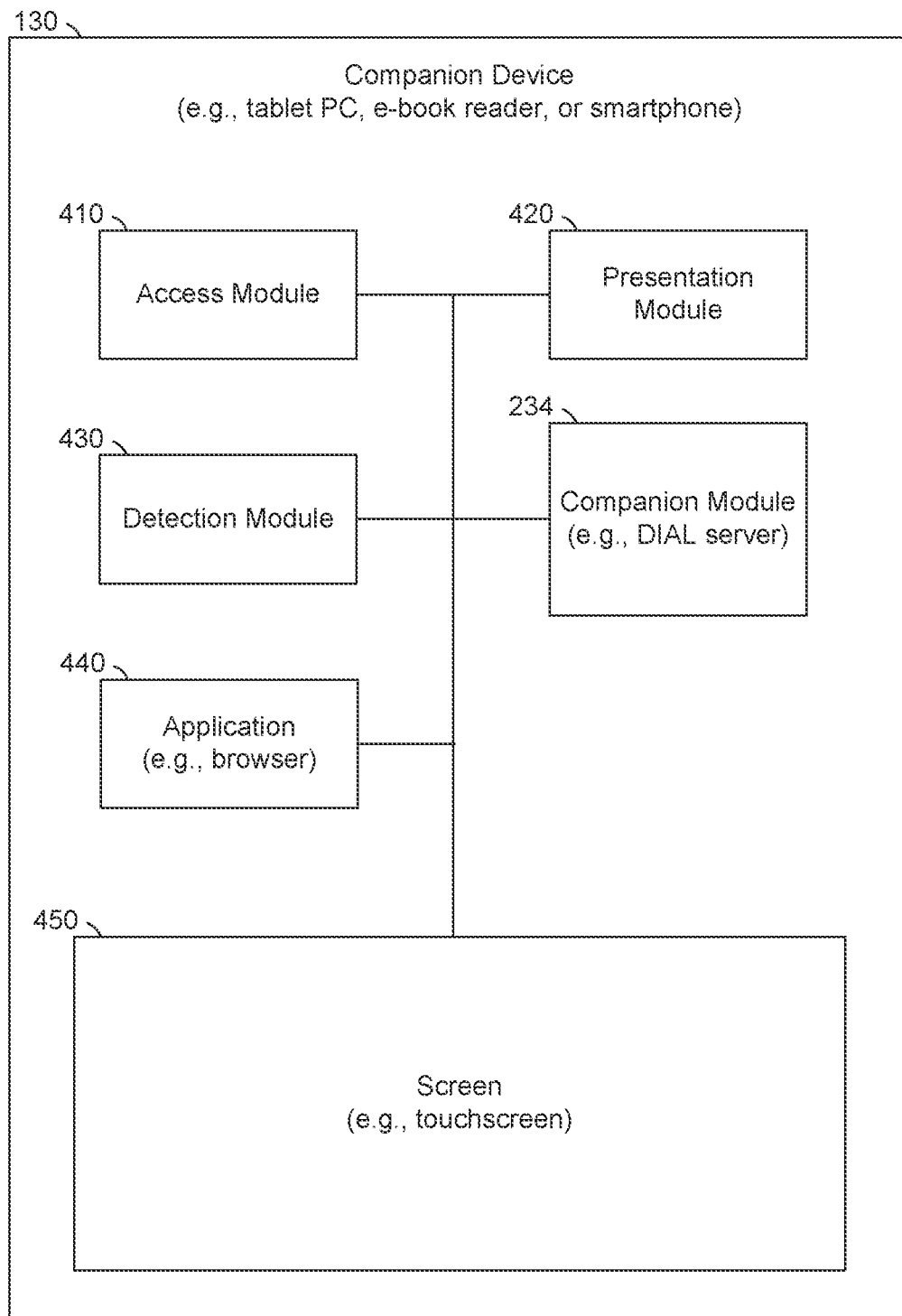
FIG. 4 is a block diagram illustrating components of the companion device, according to some example embodiments.

FIG. 4 is a block diagram illustrating components of the companion device 130, according to some example embodiments. The companion device 150 may be similarly configured. The companion device 130 is shown as including an access module 410, a presentation module 420, a detection module 430, an application 440 (e.g., a browser or a mobile app), a screen 450 (e.g., a touchscreen or other display screen), and the companion module 234 (e.g., generated provided by the media server machine 110), all configured to communicate with each other (e.g., via a bus, shared memory, or a switch). As noted above, any one or more of these modules may be implemented using hardware (e.g., a processor of a machine), and any module described herein may configure a processor to perform the operations described herein for that module.

The access module 410 is configured to receive a launch instruction sent from the media device 140. The access module 410 may be further configured to access (e.g., receive, retrieve, or otherwise obtain) supplemental content from the web server machine 120. The presentation module 420 is configured to present the supplemental content on the screen 450. The detection module 430 is configured to detect one or more media devices (e.g., media device 140) coming within physical proximity of the companion device 130, for example, coming within a threshold distance of the companion device 130 (e.g., within IR signal range, within wireless networking range, or within a predetermined distance as determined by geolocation techniques, such as by use of GPS data) and establish one or more communication links with such detected media devices.

The companion module 234 may be or include a DIAL server (e.g., configured to launch one or more applications on the companion device 130 at the request of a DIAL client), and the companion module 234 may be configured to launch the application 440, which may be stored at the companion device 130 (e.g., after being downloaded to the companion device 130 from the media server machine 110, from the media device 140, from the web server machine 120, or any suitable combination thereof). The launching of the application 440 may be in response to the launch instruction received by the access module 410. The launch instruction may specify the application 440 to be launched, and the launch instruction may specify (e.g., identify, indicate, or locate) supplemental content to be accessed by the access module 410 and presented by the application. In some example embodiments, the companion module 234 forms all or part of an application that is stored by the companion device 130 and launched (e.g., executed) by the companion device 130 (e.g., in response detection of one or more media devices, in response to user input, or both).

The application 440 may be or include a browser, a mobile app, or other software suitable for presenting supplemental content. In some example embodiments, the companion device 130 is adequate to execute the application 440, while the media device 140 is inadequate to execute the application 440. For example, the media device 140 may lack the hardware resources (e.g., processor speed or memory) to execute the application 440.

The screen 450 may be a touchscreen (e.g., a touch-sensitive display screen) of the companion device 130. Accordingly, while the media device 140 may present media content on the display 142 (e.g., a primary display or primary screen), the companion device 130 may present supplemental content on the screen 450 (e.g., secondary display or secondary screen).

Figure 5:
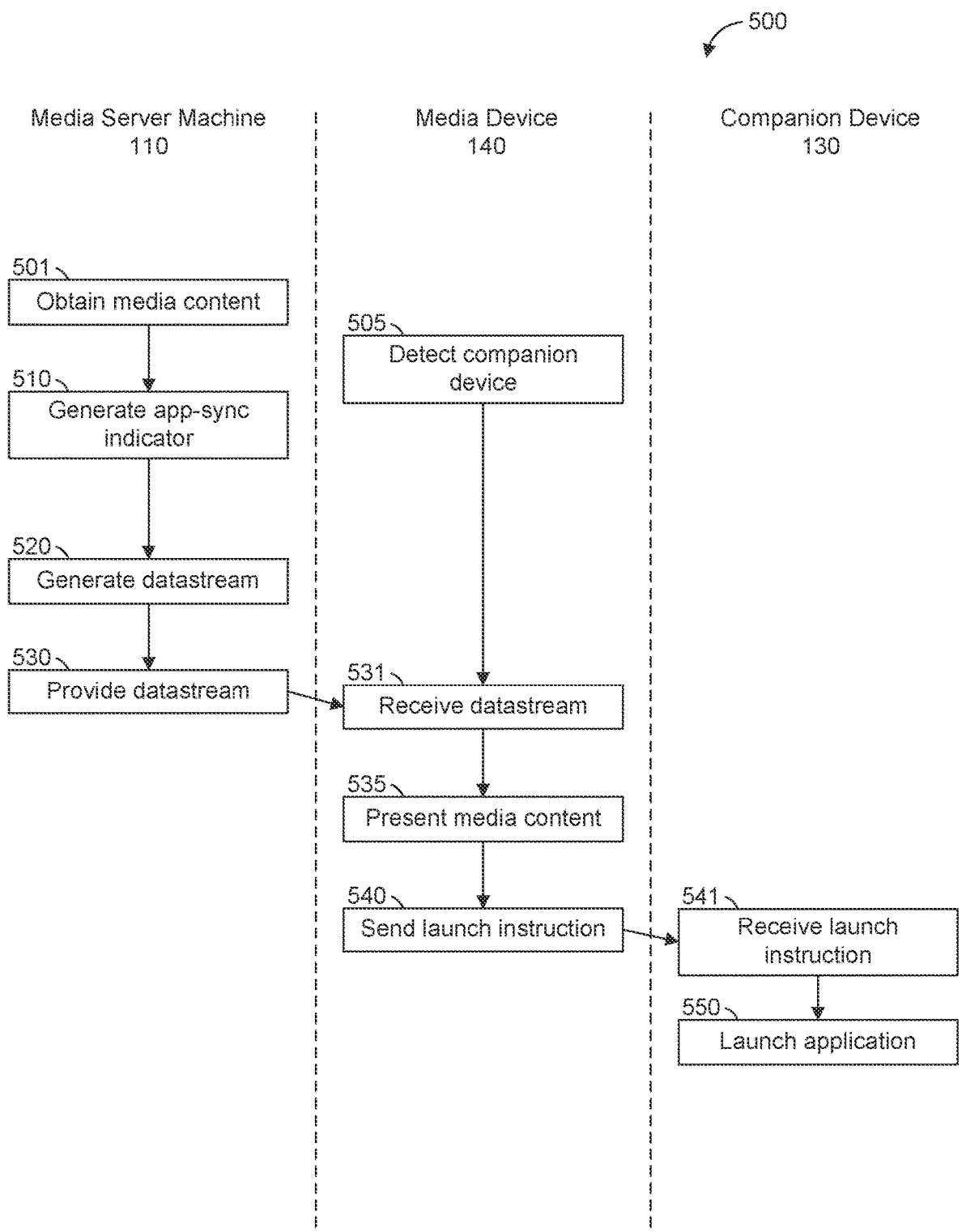
FIG. 5 is a flowchart illustrating data flows within the network environment, according to some example embodiments.

FIG. 5 is a flowchart illustrating data flows within the network environment 100 during performance of a method 500 for synchronizing the application 440 on the companion device 130, according to some example embodiments. In operation 501, the generator module 210 of the media server machine 110 obtains media content (e.g., accesses, receives, or retrieves media content from an upstream media source, such as a television station, a satellite, or other provider of media content). In operation 510, the generator module 210 of the media server machine 110 generates an app-sync indicator for inclusion (e.g., contemporaneous inclusion, so that the presentation time of the app-sync indicator falls within the presentation times of the media content) with the media content in a datastream. In operation 520, the generator module 210 generates the datastream that includes (e.g., contemporaneously) the media content and the app-sync indicator for the media content. For example, the generator module 210 may generate a datastream by multiplexing the media content with the app-sync indicator (e.g., in the form of a data table) into the resulting datastream.

In operation 530, the provision module 220 of the media server machine 110 provides the datastream to the media device 140 (e.g., via the network 190). The datastream may be provided via any one or more data communication technologies (e.g., cable television network, satellite television network, a cellular telephone network, Internet protocol television (IPV), hypertext transfer protocol live streaming (HLS), over the top (OTT) streaming, or any suitable combination thereof). Operation 530 may include providing the app-sync indicator (e.g., contemporaneously) with the media content to the media device 140. For example, the app-sync indicator may be provided with its presentation time (e.g., a time at which the media device 140 takes action on the app-sync indicator) falling within the presentation times of the media content (e.g., a range of times at which the media device 140 presents the media content, such as, the duration of a clip, scene, or program). As noted above, the media device 140 may be configured to present the media content on the display 142, to detect the companion device 130, and to send a launch instruction to the companion device 130 based on the app-sync indicator. As also noted above, the companion device 130 may be configured to launch the application 440 in response to the launch instruction sent from the media device 140.

In operation 505, the detection module 330 of the media device 140 detects the companion device 130 (e.g., detects the presence of the companion device 130 within IR range, wireless networking range, or a predetermined threshold distance of the media device 140). The media device 140 may thereafter establish a communication link with the detected companion device 130. In some example embodiments, prior to operation 505, the media server machine 110 provides the detection module 330 to the media device 140.

In operation 531, the reception module 310 of the media device 140 accesses (e.g., receives, reads, or retrieves) the datastream provided by the media server machine 110. Hence, the reception module 310 may access (e.g., receive) the media content (e.g., contemporaneously) with the app-sync indicator. In operation 535, the presentation module 320 of the media device 140 presents the media content on the display 142. In operation 540, the synchronization module 232 on the media device 140 sends a launch instruction to the companion device 130 (e.g., via IR signals or a wireless peer-to-peer network). The launch instruction may be usable by the companion device 130 to launch the application 440.

In operation 541, the access module 410 of the companion device 130 receives the launch instruction sent from the media device 140. The launch instruction may reference the application 440 (e.g., a browser). In operation 550, the companion module 234 on the companion device 130, in response to the launch instruction, launches the application 440. Since the time between operations 535 and 550 may be perceived by the user 132 as being subjectively short (e.g., under one second), the launching of the application 440 may be perceived by the user 132 as being synchronized with the presentation of the media content. The application 440 may cause the access module 410 of the companion device 130 to access supplemental content from the web server machine 120, and the application 440 may cause presentation module 420 of the companion device 130 to present the accessed supplemental content on the screen 450 of the companion device.

Figure 6:
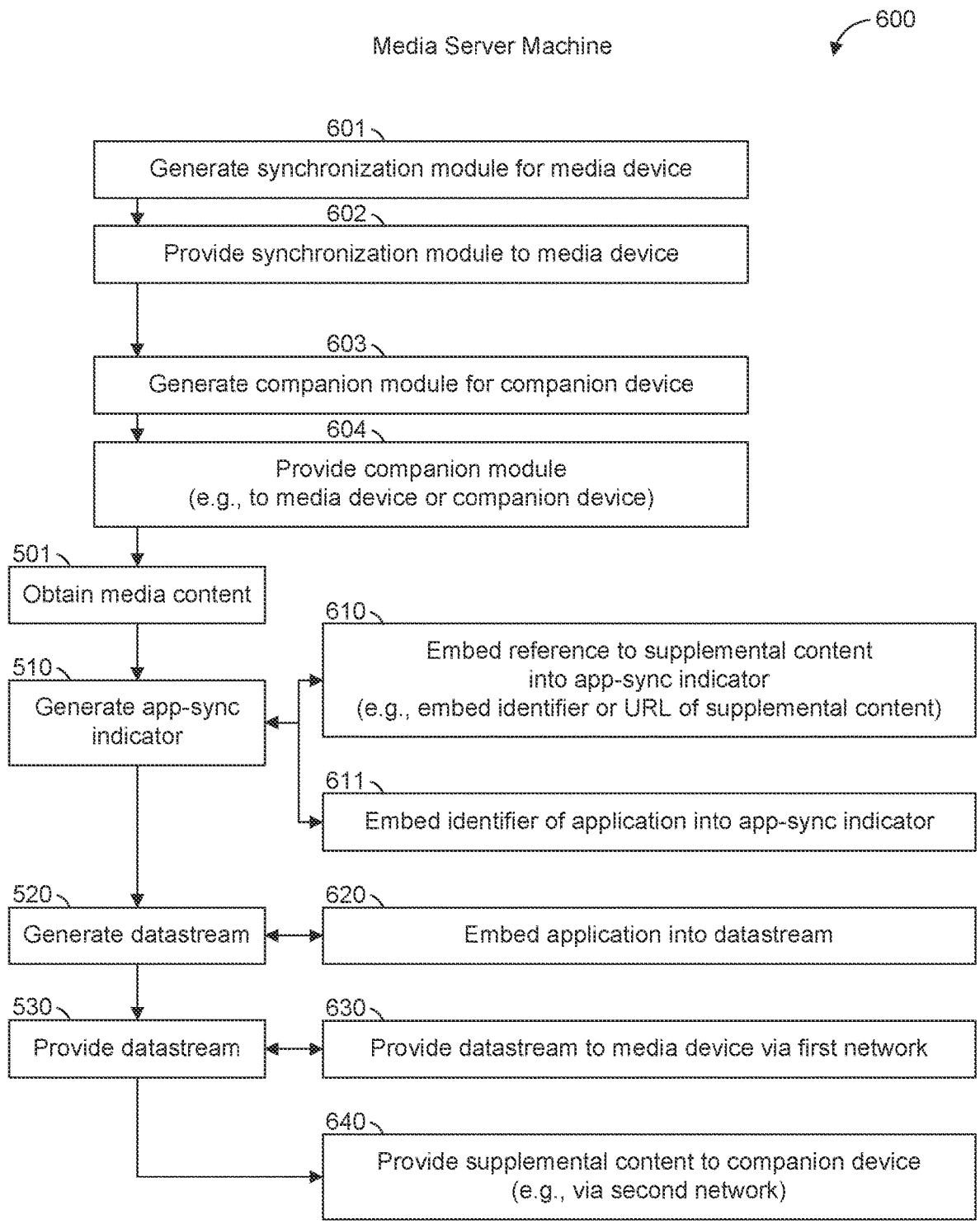
FIG. 6 is a flowchart illustrating operations of the media server machine in performing a method of synchronizing an application on the companion device, according to some example embodiments.

FIG. 6 is a flowchart illustrating operations of the media server machine 110 in performing a method 600 of synchronizing the application 440 on the companion device 130, according to some example embodiments. Operations in the method 600 may be performed using modules described above with respect to FIG. 2. As shown in FIG. 6, the method 600 includes operations 501, 510, 520, and 530, and may include one or more of operations 601, 602, 603, 604, 610, 611, 620, 630, and 640.

In operation 601, the server module 230 generates the synchronization module 232 (e.g., for the media device 140). For example, the server module 230 may assemble the synchronization module 232 as a data package of various software subcomponents (e.g., a DIAL client and a list of trusted companion devices, such as the companion devices 130 and 150). Operation 601 may include creating the synchronization module 232 or updating (e.g., modifying) the synchronization module 232.

In operation 602, the server module 230 provides the synchronization module 232 to the media device 140 (e.g., via the network 190). In response, the media device 140 may be configured, at least in part, by the synchronization module 232.

In operation 603, the server module 230 generates the companion module 234 (e.g., for the companion devices 130 and 150). For example, the server module 230 may assemble the companion module 234 as a data package of various software subcomponents (e.g., a DIAL server and a list of trusted web server machines, such as the web server machine 120). Operation 603 may include creating the companion module 234 or updating (e.g., modifying) the companion module 234).

In operation 604, the server module 230 provides the companion module 234 to the media device 140 (e.g., via the network 190, for subsequent provision by the media device 140 to the companion device 130) or to the companion device 130 (e.g., via the network 192). In response to receiving the companion module 234, the synchronization module 232 of media device 140 may provide (e.g., relay) the companion module 234 to the companion device 130. In response to receiving the companion module 234, the companion device 130 may be configured, at least in part, by the companion module 234.

In the method 600, operations 501, 510, 520, and 530 may each be performed in a manner similar to that described above with respect to FIG. 5. One or more of operations 610 and 611 may be performed as part (e.g., a precursor task, a subroutine, or a portion) of operation 510, in which the generator module 210 of the media server machine 110 generates the app-sync indicator.

In operation 610, the generator module 210 embeds a reference (e.g., an identifier or a pointer) to the supplemental content for the media content into the app-sync indicator. For example, the embedded reference may be or include a URI (e.g., URL) that identifies (e.g., names, locates, or both) the supplemental content, which corresponds to the media content. This reference may be extracted by the media device 140 and included in the launch instruction sent to the companion device 130, which may launch the application 440 with the reference as an input to the application 440.

In operation 611, the generator module 210 embeds an identifier of the application 440 into the app-sync indicator (e.g., a name of the application 440, with or without an authentication code). In situations where multiple applications (e.g., application 440) are available for being synchronously launched with the media content, embedding the identifier of the application 440 into the app-sync indicator enables the media device 140 to send one or more launch instructions based on the app-sync indicator identifying the application 440. For example, the media device 140 may send a launch instruction that specifies which application (e.g., application 440) is to be synchronously launched with the media content. Accordingly, the companion device 130 may launch the application 440 based on the launch instruction identifying the application 440.

Operation 620 may be performed as part of operation 520, in which the generator module 210 of the media server machine 110 generates the datastream. In operation 620, the generator module 210 embeds the application 440 into the datastream. For example, the application 440 may be stored by the database 115, and the generator module 210 may access the application 440 from the database 115 and multiplex the application 440 into the datastream so that the application 440 may be provided within the datastream to the media device 140 for subsequent provision to the companion device 130. Although the app-sync indicator and the media content may be provided contemporaneously together (e.g., with each other, so that the presentation time of the app-sync indicator falls within the presentation times of the media content) within the datastream, the application 440 may be provided prior to the media content and the app-sync indicator within the datastream. In such situations, the synchronization module 232 of the media device 140 may provide (e.g., relay) the application 440 to the companion device 130 for storage thereon, so that the application 440 may be launched at the appropriate time (e.g., in sync with the media content being presented on the display 142 by the media device 140). As another example, the synchronization module 232 may provide a URL from which the application 440 can be obtained by the companion device 130.

According to some example embodiments, the network 190 may be optimized for broadcast of media content, while the network 192 may be optimized for interactive selection and presentation of supplemental content. Operation 630 may be performed as part of operation 530, in which the provision module 220 of the media server machine 110 provides the datastream. In operation 630, the provision module 220 provides the datastream via the network 190 (e.g., a first network), which may be contrasted with the network 192 (e.g., a second network). Operation 640 may be performed with or after operation 530. In operation 640, the provision module 220 provides the supplemental content via the network 192 (e.g., the second network). For example, the supplemental content may be stored by the database 115, the media server machine 110, the web server machine 120, or any suitable combination thereof, and the supplemental content may be provided by the provision module 220 to the companion device 130 (e.g., in response to the launching of the application 440 with a reference to the supplemental content as an input parameter). This providing of the supplemental content may be relayed through the web server machine 120.

Figure 7:
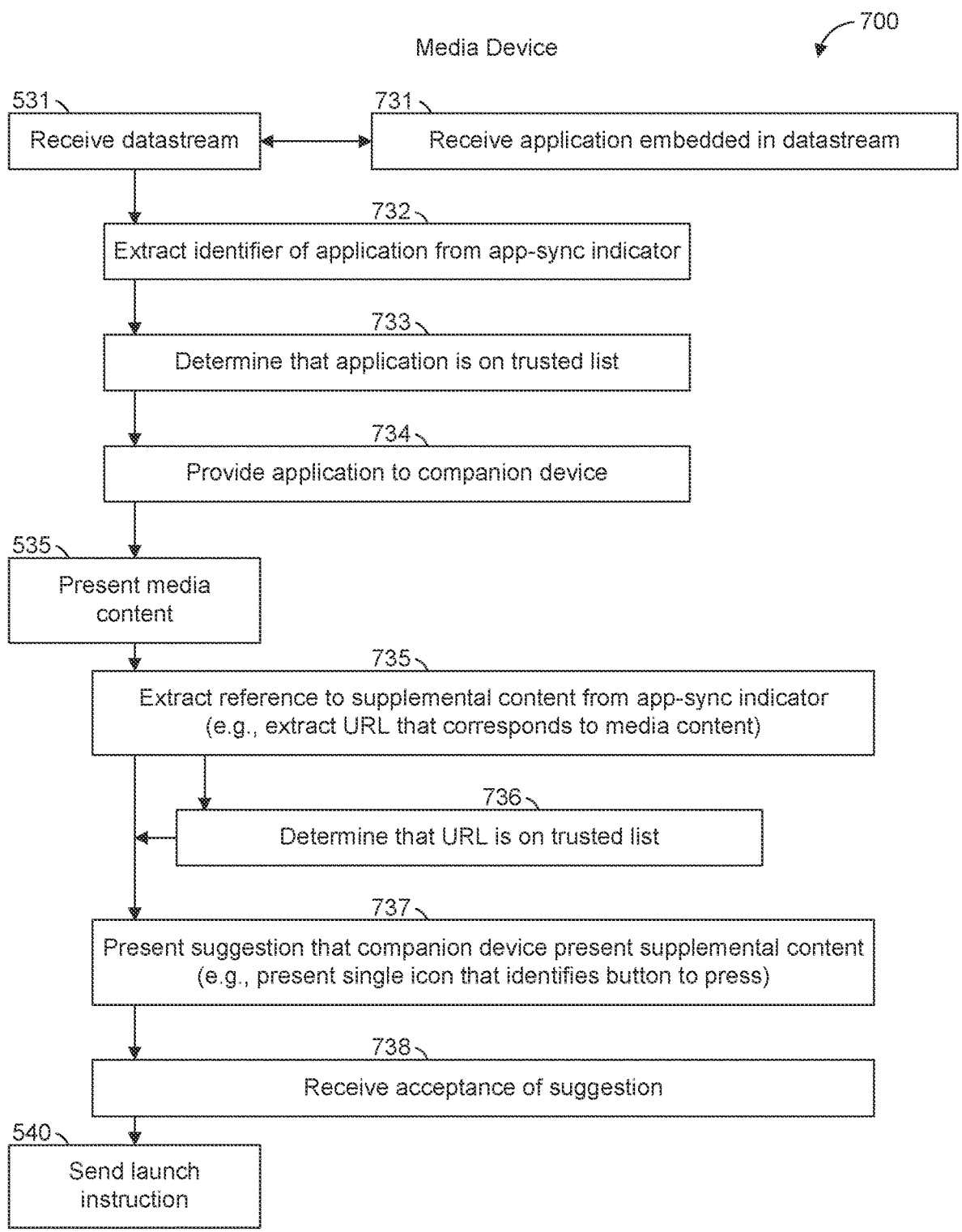
FIG. 7-9 are flowcharts illustrating operations of the media device in performing a method of synchronizing the application on the companion device, according some example embodiments.
Figure 8:
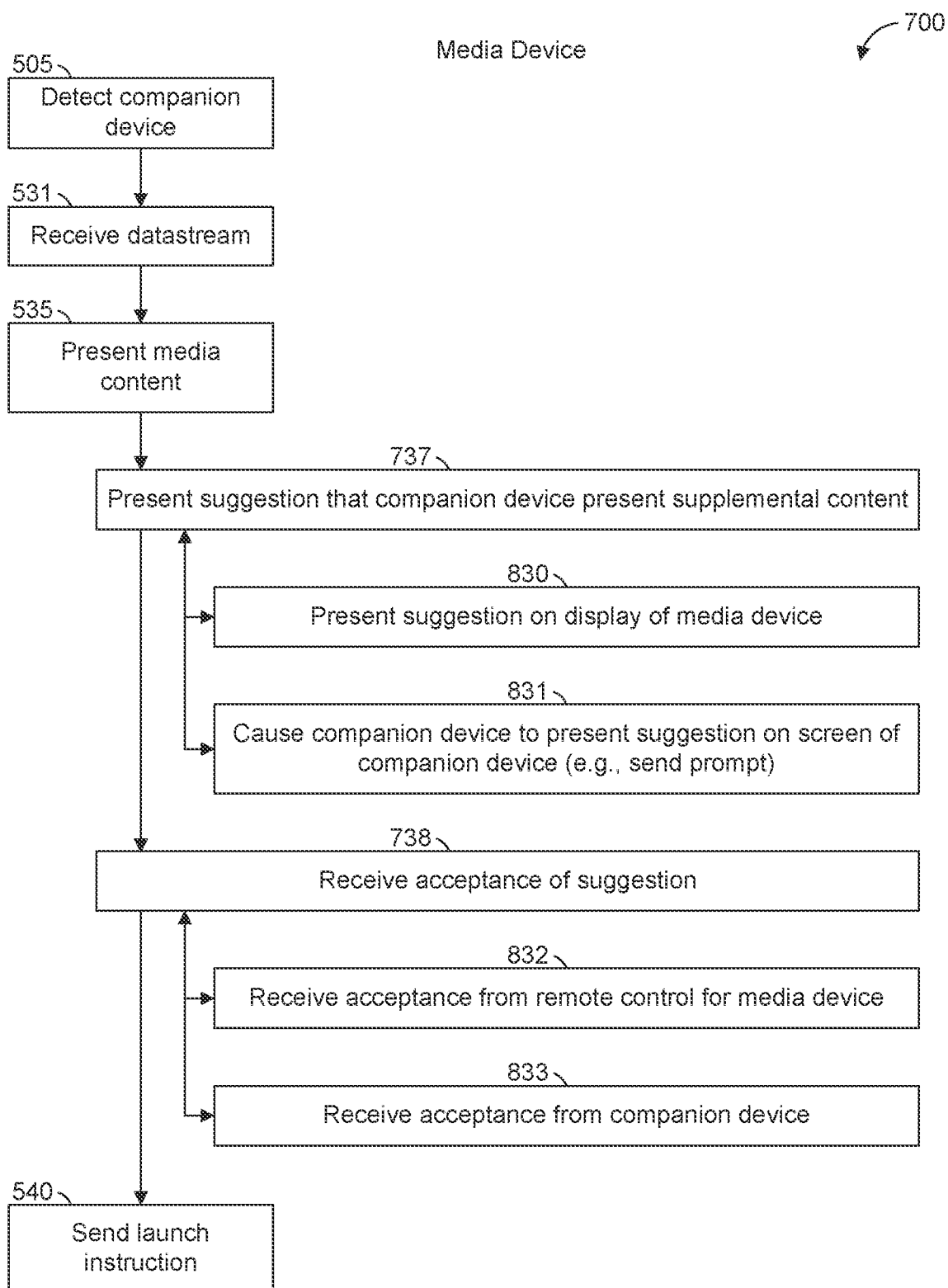
Figure 9:
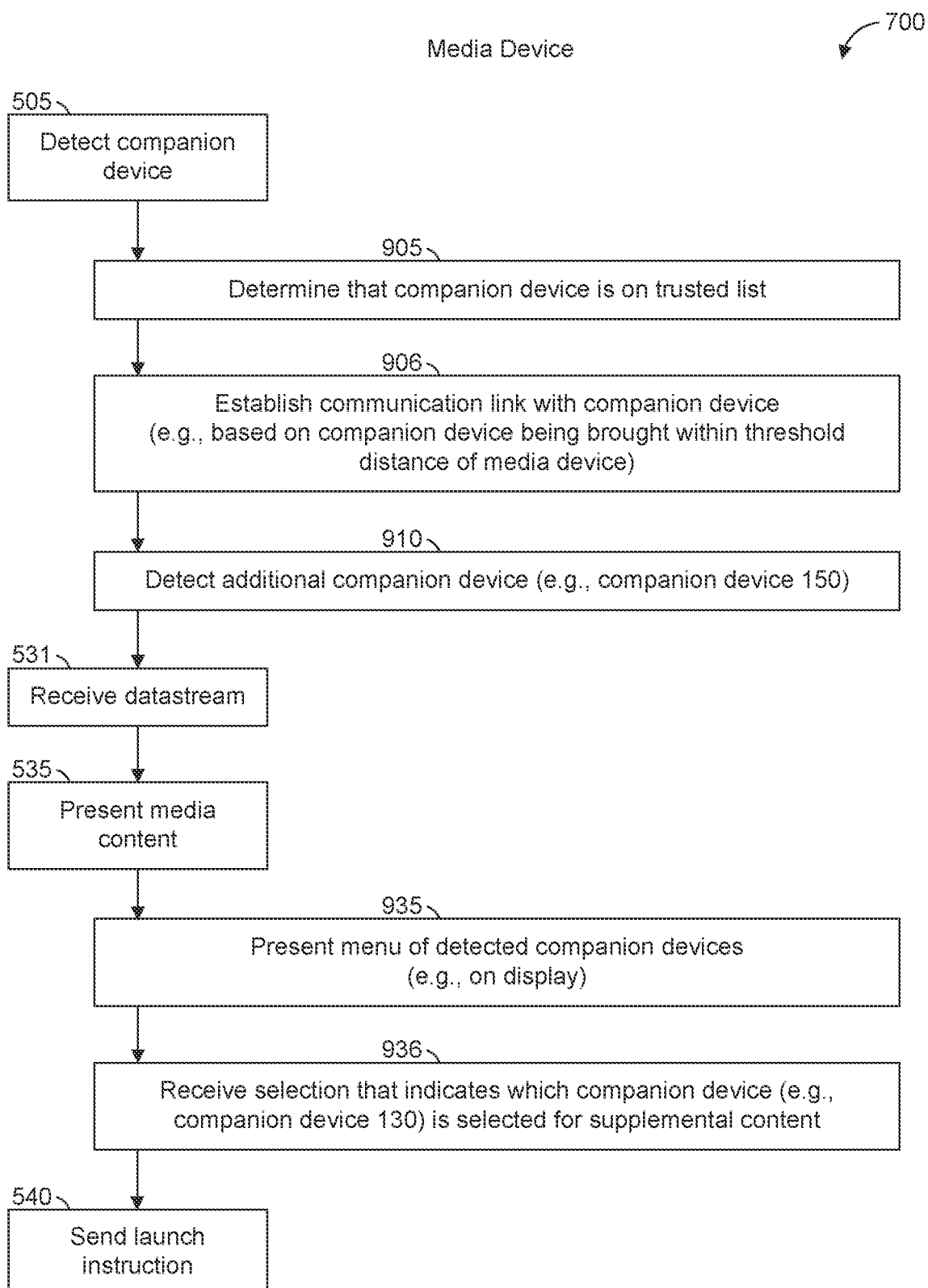

FIG. 7-9 are flowcharts illustrating operations of the media device 140 in performing a method 700 of synchronizing the application 440 on the companion device 130, according some example embodiments. Operations in the method 700 may be performed using modules described above with respect to FIG. 3. As shown in FIG. 7, the method 700 includes operations 531, 535, and 540 and may include one or more of operations 731, 732, 733, 734, 735, 736, 737, and 738.

Operation 731 may be performed as part of operation 531, in which the reception module 310 of the media device 140 receives the datastream provided by the media server machine 110. In operation 731, the reception module 310 receives the application 440 embedded in the datastream. This may enable the synchronization module 232 of the media device 140 to provide (e.g., relay) the application 440 to the companion device 130 (e.g., for storage thereon, in preparation for launching the application 440 in sync with the presentation of the media content by the presentation module 320 of the media device 140 on the display 142).

In operation 732, the synchronization module 232 extracts an identifier (e.g., an application name, with or without an authentication code) of the application 440 from the app-sync indicator. As noted above, the identifier of the application 440 may be embedded in the app-sync indicator, and may identify the application 440 among multiple applications. Operation 733 may be performed before, during, or after operation 531. In operation 733, the synchronization module 232 determines that the application 440 is on a trusted list (e.g., a list of trusted applications, among which is the application 440), which may have the effect of providing a degree of security checking that only trusted applications are launched on the companion device 130. According to various example embodiments, this determination may be performed based on the extracted identifier from operation 732, performed in response to the application being received in operation 731, or both. The trusted list may be included (e.g., stored) in the synchronization module 232 (e.g., as generated by the server module 230 of the media server machine 110) or provided to the synchronization module 232 (e.g., as an update) by the media server machine 110, by the database 115, or by the web server machine 120 (e.g., via secure sockets layer (SSL) communication).

In operation 734, the synchronization module 232 provides the application 440 to the companion device 130 for storage thereon, execution thereon, or both. In some example embodiments, the application 440 is provided via a communication link established between the media device 140 and the companion device 130 (e.g., an IR or wireless connection). In situations where the application 440 is already stored on the companion device 130, operation 734 may be omitted. Similarly, operation 734 may be omitted in situations where the companion device 130 is configured to obtain (retrieve, fetch, or access) the application 440 based on the URL provided by the synchronization module 232.

In operation 735, the synchronization module 232 extracts the reference to the supplemental content from the app-sync indicator (e.g., the reference that was embedded in operation 610). For example, the synchronization module 232 may extract a URI (e.g., URL) that identifies the supplemental content to be presented by the application 440 launched while the media content is being presented on the display 142. Example embodiments that include operation 735 may also include operation 736. Operation 736, the synchronization module 232 determines that the reference (e.g., the URL) is on a trusted list (e.g., a list of trusted references to supplemental content, such as URLs served by the web server machine 120), which may have the effect of providing a degree of security checking that only trusted references to supplemental content are used. This determination may be performed based on the extracted reference from operation 735, performed in response to the app-sync indicator being received in operation 531, or both. The trusted list may be included (e.g., stored) in the synchronization module 232 (e.g., as generated by the server module 230 of the media server machine 110) or provided to the synchronization module 232 (e.g., as an update) by the media server machine 110, by the database 115, or by the web server machine 120 (e.g., via SSL communication).

In operation 737, as shown in FIG. 7-8, the synchronization module 232 causes the media device 140 to present a suggestion that the companion device 130 (e.g., specifically as the companion device 130, or generically as one of multiple available companion devices) present the supplemental content (e.g., referenced by the app-sync indicator). For example, as shown in FIG. 8, operation 737 may include operation 830, in which the synchronization module 232 presents a suggestion on the display 142 (e.g., by causing the presentation module 320 of the media device 14o to present the suggestion on the display 142). As another example, shown in FIG. 8, operation 737 may include operation 831, in which the synchronization module 232 causes the companion device 130 (e.g., via its presentation module 420, its companion module 234, or both) to present the suggestion on its screen 450 (e.g., by sending a prompt to the companion module 234 of the companion device 130).

According to various example embodiments, the suggestion may take the form of a single icon (e.g., a single green button that identifies a button or key on a remote control that is configured to fully or partially control the media device 140 by selecting media content for presentation on the display 142). Such a single icon may indicate availability of the supplemental content for presentation, identify a button or key (e.g., on a remote control, on the companion device 130, or both) that is operable to submit an acceptance of the suggestion to present the supplemental content, or both.

In operation 738, as shown in FIG. 7-8, the synchronization module 232 receives an acceptance of the suggestion. For example, as shown in FIG. 8, operation 738 may include operation 832, in which the synchronization module 232 receives the acceptance from a remote control (e.g., remote control device) that is configured to fully or partially control the media device 140. The acceptance may be received by detecting that a button or key on a remote control for the media device 140 has been pressed to indicate that the suggestion is accepted (e.g., to indicate that the supplemental content is to be presented). As another example, as shown in FIG. 8, operation 738 may include operation 833, in which the synchronization module 232 receives the acceptance of the suggestion from the companion device 130. This may be performed by detecting that a button or key (e.g., physical or virtual) on the companion device 130 has been pressed to indicate that the suggestion is accepted.

As shown in FIG. 9, the method 700 may include one or more of operations 505, 905, 906, 910, 935, and 936. As noted above, operation 505 involves the detection module 330 of the media device 140 detecting the companion device 130 (e.g., coming within IR range, wireless networking range, or within a predetermined threshold distance of the media device 140).

In operation 905, the detection module 330 of the media device 140 determines that the detected companion device 130 is on a trusted list (e.g., a list of trusted companion devices, among which is the companion device 130), which may have the effect of providing a degree of security checking that only trusted companion devices may be used. This determination may be performed based on (e.g., in response to) the detection of the companion device 130 in operation 505. The trusted list may be included (e.g., stored) in the detection module 330, included in the synchronization module 232 (e.g., as generated by the server module 230 of the media server machine 110), or provided to the detection module 330 or the synchronization module 232 (e.g., as an update) by the media server machine 110, by the database 115, or by the web server machine 120 (e.g., via SSL communication).

In operation 906, the detection module 330 of the media device 140 establishes a communication link with the companion device 130 (e.g., with its companion module 234). This communication link may be established based on the companion device 130 being brought within IR range, within wireless networking range, within a predetermined threshold distance of the media device 140, or any suitable combination thereof. In addition, this communication link may be established based on the determination in operation 905 that the detected companion device 130 is on the trusted list. Examples of such a communication link include an IR connection, wireless networking connection (e.g., personal area network (PAN) connection, such as a Bluetooth connection), or any suitable combination thereof.

In operation 910, the detection module 330 of the media device 140 detects one or more additional companion devices (e.g., companion device 150). Such detection of multiple companion devices (e.g., companion devices 130 and 150) enables the media device 140 to perform operation 935, in which the presentation module 320 of the media device 140 presents a menu of detected companion devices (e.g., companion devices 130 and 150) on the display 142. The menu may indicate that the detected companion devices are available to present the supplemental content. The presented menu, in some example embodiments, may be limited to only those detected companion devices that are identified on the trusted list of companion devices. The presented menu may enable one or more users (e.g., user 132 or user 152) to select which of the detected companion devices should be used to present the supplemental content. In certain example embodiments, the selection may be made from the presented menu (e.g., by the user 132 navigating presented menu and making the selection using a remote control for the media device 140). In some example embodiments, the selection may be made from one or more of the detected companion devices (e.g., by the user 132 pressing a button or key (e.g., physical or virtual) on the companion device 130 to select the companion device 130). In such example embodiments, operation 935 may be omitted.

In operation 936, the synchronization module 232 of the media device 140 receives a selection that indicates which companion device (e.g., companion device 130) from the presented menu is selected for presenting the supplemental content. For example, the selection may be received by detecting that one or more buttons or keys (e.g., a navigation up key, navigation down key, or a selection confirmation key) on a remote control for the media device 140 has been pressed indicate the selection. As another example, the selection may be performed by detecting that a button or key (e.g., physical or virtual) on the companion device 130 has been pressed to indicate the selection.

In example embodiments that include operations 935 and 936, the sending of the launch instruction in operation 540 may be performed based on (e.g., in response to) the selection received in operation 936. For example, the selection may identify the companion device 130 as being selected for presentation of the supplemental content, and the launch instruction may be sent in operation 540 to the companion device 130 in accordance with the received selection.

Figure 10:
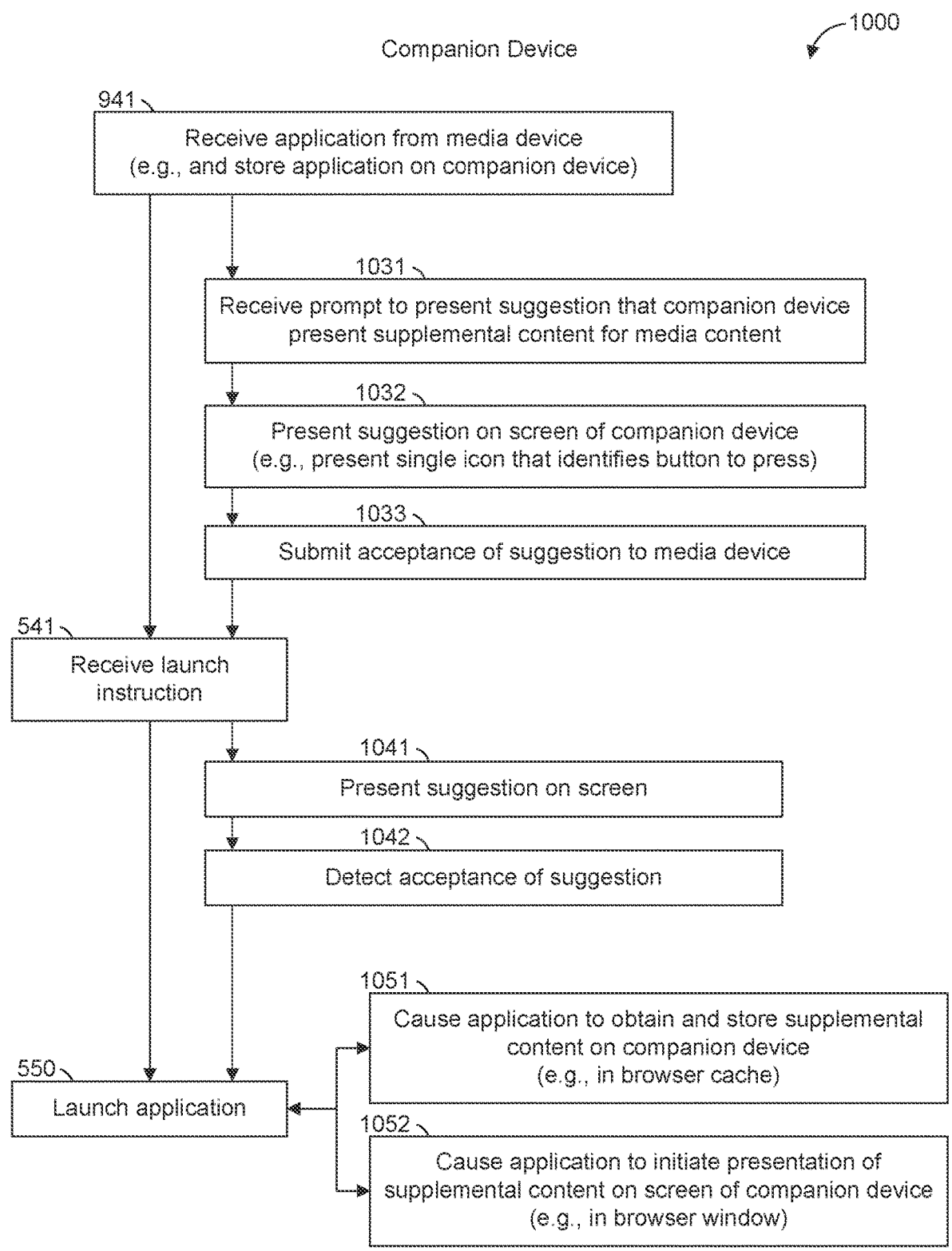
FIG. 10 is a flowchart illustrating operations of the companion device in performing a method of synchronizing the application, according to some example embodiments.

FIG. 10 is a flowchart illustrating operations of the companion device 130 in performing a method 1000 of synchronizing the application 440, according to some example embodiments. Operations and the method 1000 may be performed using modules described above with respect to FIG. 4. As shown in FIG. 10, the method 1000 includes operations 541 and 550, and may include one or more of operations 941, 1031, 1032, 1033, 1041, 1042, 1051, and 1052.

In operation 941, the access module 410 of the companion device 130 receives the application 440 from the media device 140 (e.g., as a result of the media device 140 in performing operation 734). The access module 410 may then store the application 440 on the companion device 130 (e.g., in memory). According to various example embodiments, operation 941 may be performed before, during, or after operation 541.

In operation 1031, the companion module 234 of the companion device 130 receives a prompt to present the suggestion discussed above with respect to operation 831. The prompt may be sent from the synchronization module 232 of the media device 140. In some example embodiments, the companion module 234 receives the prompt via the access module 410 of the companion device 130.

In operation 1032, the companion module 234 presents the suggestion on the screen 450. For example, the companion module 234 may cause presentation module 420 to present the suggestion on the screen 450. As noted above, the suggestion may be or include a single icon that identifies a button or key that, if pressed, would indicate that the supplemental content is to be presented by the application 440. An acceptance of the presented suggestion may be received by the screen 450 (e.g., as a touch input from the user 132 on the identified button or key).

In operation 1033, the companion module 234 of the companion device 130 submits the acceptance of the suggestion to the media device 140 (e.g., via its synchronization module 232). This may enable the media device 140 to provide the launch instruction in operation 540 based on (e.g., in response to) the acceptance of the suggestion. As noted above, in operation 541, the access module 410 of the companion device 130 receives the launch instruction from the media device 140.

In certain example embodiments, the presentation of the suggestion and the detection of the acceptance is handled completely by the companion device 130. In such example embodiments, operations 1041 and 1042 may be performed after the launch instruction is received in operation 541. In operation 1041, the companion module 234 presents the suggestion on the screen 450 (e.g., by causing the presentation module 420 to present the suggestion on the screen 450). Operation 1041 may be performed based on (e.g., in response to) the launch instruction being received in operation 541. In operation 1042, an acceptance of the presented suggestion is received by the screen 450 (e.g., as a touch input from the user 132). In example embodiments that include operation 1042, the launching of the application 440 in operation 550 may be performed based on the detected acceptance of the suggestion.

One or more of operations 1051 and 1052 may be performed as part of operation 550, in which the companion module 234 of the companion device 130 launches the application 440 on the companion device 130. In operation 1051, the companion module 234 causes the application 440 to obtain and store the supplemental content (e.g., as identified in the received launch instruction) on the companion device 130. For example, the companion module 234 may cause the application 440 to obtain the supplemental content from the web server machine 120 and then store the supplemental content in a memory (e.g., a browser cache) of the companion device 130. This may enable the application 440 to be subsequently launched multiple times to present the supplemental content.

In operation 1052, the companion module 234 causes the application 440 to initiate a presentation of the supplemental content on the screen 450 of the companion device 130. For example, the application 440 may initiate the presentation within a browser window of the application 440, where the browser window is rendered to the screen 450. Accordingly, since the application 440 was launched based on the received launch instruction, which was sent based on the app-sync indicator being received contemporaneously with the media content, the screen 450 may launch the application 440 synchronously with the media content being presented on the display 142. Moreover, the screen 450 may immediately display the supplemental content contemporaneously with the presentation of the media content (e.g., while the media content is presented on the display 142).

Figure 11:
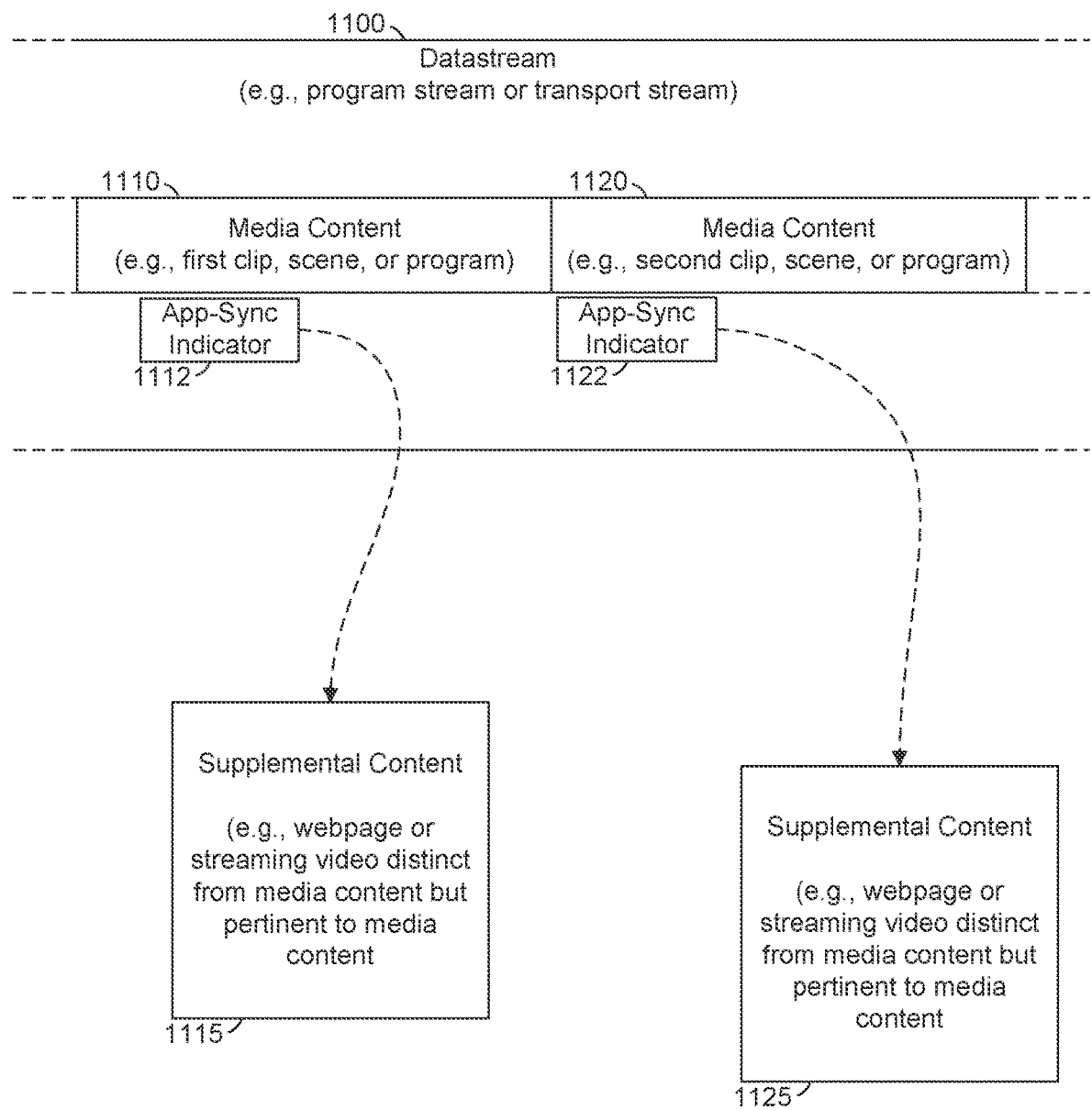
FIG. 11 is a block diagram illustrating relationships among media content, app-sync indicators, and supplemental content that is pertinent to the media content, according to some example embodiments.

FIG. 11 is a block diagram illustrating relationships among media content 1110 and 1120, app-sync indicators 1112 and 1122, and supplemental content 1115 and 1125, within a datastream 1100, according to some example embodiments. The datastream 1100 may be a program stream, a transport stream, or any other suitable data feed that multiplexes various media content with various app sync indicators. As shown in FIG. 11, the media content 1110 may be a first clip, scene, or program within the datastream 1100, and the media content 1110 may be provided contemporaneously with the app-sync indicator 1112 in the datastream 1100. Similarly, the media content 1120 may be a second clip, scene, or program within the datastream 1100, and the media content 1120 may be provided contemporaneously with the app-sync indicator 1122 in the datastream 1100. Hence, the app-sync indicator 1112 may correspond to the media content 1110, and the app-sync indicator 1122 may correspond to the media content 1120.

Furthermore, the app-sync indicator 1112 may correspond to the supplemental content 1115. As indicated in FIG. 11, the supplemental content 1115 may be or include a webpage or streaming video, and the supplemental content 1115 may be distinct from the media content 1110, but still pertinent to the media content 1110. Likewise, the supplemental content 1125 may be or include a webpage or streaming video, and the supplemental content 1125 may be distinct from the media content 1120, but nonetheless pertinent to the media content 1120.

The correspondence relationship between the app-sync indicator 1112 and the media content 1110 may arise based on the app-sync indicator 1112 being provided contemporaneously with the media content 1110 within the datastream 1100. For example, the contemporaneous provision of the media content 1110 and the app-sync indicator 1112 may be within a short time period (e.g., as perceived by the user 132), such as within five seconds of each other. A similar correspondence relationship may exist between the app-sync indicator 1122 and the media content 1120.

The correspondence relationship between the app-sync indicator 1112 and the supplemental content 1115 may arise based on the app-sync indicator 1112 being or including an identifier of the supplemental content 1115 (e.g., URI), a reference to the supplemental content 1115 (e.g., a URL), or any suitable combination thereof. A similar correspondence relationship may exist between the app-sync indicator 1122 and the supplemental content 1125.

In certain example embodiments, the full functionality of app-sync indicator 1112 may be implemented by multiple app-sync indicators that each perform just a portion of this full functionality. For example, a first app-sync indicator may identify the synchronization module 232 of the media device 140, and the media device 140 may launch its synchronization module 232 based on (e.g., response to) this first app-sync indicator being provided in the datastream (e.g., provided contemporaneously with the media content 110, in a manner similar to that described above for the app-sync indicator 1112). This first app-sync indicator may contain no information that identifies the application 440 to be launched by the companion device 130, and this first app-sync may contain no information that identifies any supplemental content (e.g., supplemental content 1115) to be presented by the application 440. In such a situation, a second app-sync indicator may be provided in the datastream 1100 (e.g., contemporaneously with the media content 1110). As an example, this second app-sync indicator may identify the application 440, as well as the supplemental content 1115 to be presented by the application 440. As another example, the synchronization module 232 may have or obtain an identifier of the application 440 (e.g., as stored data, hard-coded data, or data accessed from the database 115, the media server machine 110, or the web server machine 120), and the second-sync indicator may identify only the supplemental content 1115.

According to various example embodiments, one or more of the methodologies described herein may facilitate synchronizing the launching of an application on a companion device. Moreover, one or more of the methodologies described herein may enable synchronization of such an application launch with the media content being presented on a display. Furthermore, one or more the methodologies described herein may facilitate retrieval and presentation of supplemental content via the synchronized application, so that the supplemental content is presented contemporaneously with the media content, as the media content is presented on the display.

When these effects are considered in aggregate, one or more of the methodologies described herein may obviate a need for certain efforts or resources that otherwise would be involved in synchronizing the launching of an application with media content, contemporaneous display of supplemental content with media content, or any suitable combination thereof. Efforts expended by a user in identifying, launching, or synchronizing the display of supplemental content on a companion device while media content is being presented by a media device may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

As an example of a use case, the media server machine 110 may embed the app-sync indicator 1112 in an AIT within the datastream 1100, which may include a broadcast audio-video stream of a live baseball game as the media content 1110, and this AIT may reference a webpage (e.g., by including a URL to be opened via a browser) as the supplemental content 1115. The media device 140 receives the AIT contemporaneously with audio-video content that depicts a particular point or event in the baseball game (e.g., such as particular player becoming the current "at bat" player). In response to the AIT, the media device 140 may display a green button on the display 142 for 30 seconds, after which the button fades away. The green button may be a single icon and may correspond to a green key on a remote control that is operable by the user 132 to fully or partially control the media device 140 and thereby control what is shown on the display 142.

On the media device 140, if the green key on the remote control is activated during the 30 second period, the synchronization module 232 may request from the detection module 330 a list of nearby companion devices (e.g., companion devices 130 and 150). In some example embodiments, the green key may be activated after the 30 second period (e.g., if the media device 140 registered a listener for the green key, and this listener is still active). The detection module 330 may detect those companion devices that are within a threshold distance and configured with the companion module 234. Such companion devices (e.g., companion devices 130 and 150) may be identified in a list (e.g., a menu) provided by the detection module 330 to the synchronization module 232. The synchronization module 232 may then display the list on the display 142, which may allow the user 132 to navigate the list (e.g., by pressing one or more arrow keys on the remote control) and select which of the listed companion devices (e.g., companion device 130) should be used to launch and execute a synchronized application (e.g., application 440). In response to a selection being made, the synchronization module 232 sends the launch instruction to the selected one or more companion devices (e.g., companion device 130). In some example embodiments, no list of detected companion devices is shown on the display 142, and one or more detected companion devices (e.g., identified on a trusted list of companion devices) may be automatically selected for launching executing a synchronized application (e.g., application 440).

The launch instruction may include the URL of the webpage, which may contain supplemental content that is related to the live baseball game. Such a webpage may include one or more links to supplemental content presentable by the application 440 (e.g., supplemental content 1115). Examples of such supplemental content include statistics for each team involved in the baseball game, options to select alternate camera angles that depict the live baseball game from different angles, and an option to select an alternate audio feed for the live baseball game (e.g., a radio broadcaster's announcements that describe the live baseball game play-by-play, which announcements may be more informative than the media content of the live baseball game). The user 132 may independently select his chosen option for his companion device 130, without affecting what is shown by the media device 140 on the display 142, and without affecting what the user 152 may select for presentation on her companion device 150.

Moreover, the live baseball game may depict a current "at bat" player, and the webpage may offer supplemental content that refers to the same player (e.g., supplemental content 1115). For example, the AIT may contain a reference to the player (e.g., by name); the launch instruction may include the reference to the player; and the application 440 may be launched with the reference to the player as input (e.g., as an input parameter for starting the application 440). The reference may be updated when the current "at bat" player changes (e.g., within a new version of the same AIT or in a new MT embedded in the datastream). Accordingly, the media server machine can embed such references into the datastream as events that dynamically indicate changes to the supplemental content for the live baseball game (e.g., a change that replaces the supplemental content 1115 with the supplemental content 1125). Any one or more of such events may be processed by the synchronization module 232 of the media device 140. Furthermore, processing such an event may cause the synchronization module 232 to transmit additional synchronization signals (e.g., metadata similar to an AIT) to the companion module 234 on the device 130, to the application 440 (e.g., directly), or both.

As an example feature, according to various example embodiments, the synchronization module 232 of the media device 140 may provide the application 440 on the companion device 130 with an instruction to change the supplemental content in response to the user 132 changing the datastream being accessed (e.g., receive) by the media device 140 (e.g., by the user 132 changing broadcast channels to view a different broadcast datastream). For example, this instruction to change the supplemental content may be or include a URL of new supplemental content that corresponds to the new datastream. In some example embodiments, this instruction may be provided to the companion module 234 on the companion device 130, and the companion module to a 34 may be configured to provide this URL to the application 440 upon its next launch. Accordingly, if the application 440 closed, and the user 132 changes channels on the media device 140, the application 440 may be launched with appropriate supplemental content that corresponds to the new channel.

As another example feature, according to various example embodiments, detection of new companion devices may be dynamic and ongoing. Hence, a further user (e.g., a newly arrived user, beyond users 132 and 152) may bring a further companion device (e.g., a newly arrived companion device, beyond companion devices 130 and 150) into physical proximity of the media device 140. The media device 140 may detect this new companion device and, in response, present the green button as discussed above. This may enable a convenient way to flexibly add additional users for displaying supplemental content. For example, if the media content is a game show, and the supplemental content is a webpage that lets the users 132 and 152 play along on their respective companion devices 130 and 150, one or more additional users may join the game by pressing the green key and selecting their own companion devices for presenting the webpage.

As a further example feature, according to various example embodiments, the application 440 may be configured to store some or all of the supplemental content (e.g., supplemental content 1112) presentable by the application 440, store reference (e.g., a URL) to some or all of the supplemental content, or any suitable combination thereof. This ability to store one or more portions of the supplemental content, or references thereto, may enable the application 440 to present these portions in a flexible manner depending on network performance (e.g., data transfer speeds within the network 192). For example, a recipe from a cooking show may be stored by the application 440 for repeated presentation at a later time (e.g., days or months after the presentation of cooking show has ended). The application 440 may be configured to determine an expected network performance (e.g., always well-connected, disconnected on weekends, or any other pattern of network performance). Based on this expected network performance, the application 440 may determine whether a portion of the supplemental content is to be stored, or whether a reference to the portion is to be stored. For example, if the network performance is expected to be high at a given time, but the actual network performance is low, the application 440 may store a reference to portion of the supplemental content, so that the portion may be accessed at a later time when the actual network performance is high. As another example, if the network performance is expected to be high, and the actual network performance is also high, the application 440 based store the actual portion of the supplemental content (e.g., taking advantage of the high network performance). In some hybrid situations, the application 440 may initiate storage of both the portion of the supplemental content and the reference to the supplemental content. Moreover, the application 440 may initiate storage of one portion of the supplemental content (e.g., a recipe from the cooking show) and initiate storage of a reference to another portion of the supplemental content (e.g., a video of that recipe being made).

In some example versions of this use case, the application 440 (e.g., a browser) on the companion device 130 is configured to communicate with the presentation module 320 on the media device 140. The presentation module 320 may include a browser or other suitable software that allows the application 440 on the companion device 130 to present some or all of the supplemental content on the display 142 of the media device 140. Accordingly, the user 132 may choose to activate a button labeled "send supplemental content to main screen," and allow other users (e.g., user 152) to experience the same supplemental content. Such activation may cause some or all of the supplemental content to be sent from the companion device 130 to the media device 140 for presentation on the display 142. In some example embodiments, such activation causes a reference (e.g., a URL) to some or all of the supplemental content to be sent from the companion device 130 to the media device 140, and the media device 140 may obtain (e.g., access) some or all of the supplemental content for presentation on the display 142.

Where multiple companion devices (e.g., companion devices 130 and 150) are used, according to some example embodiments, the application to be launched may vary from companion device to companion device. For example, the synchronization module 232 may have (e.g., stored) or obtain (e.g., access or receive) a profile for each individual companion device. Such profiles may form all or part of a trusted list of companion devices. The profile for a given companion device (e.g., companion device 130) may identify the application (e.g., application 440) to be launched. In certain example embodiments, the profile for a companion device (e.g., companion device 130) is or includes a profile of the primary user (e.g., user 132) of the companion device.

Figure 12:
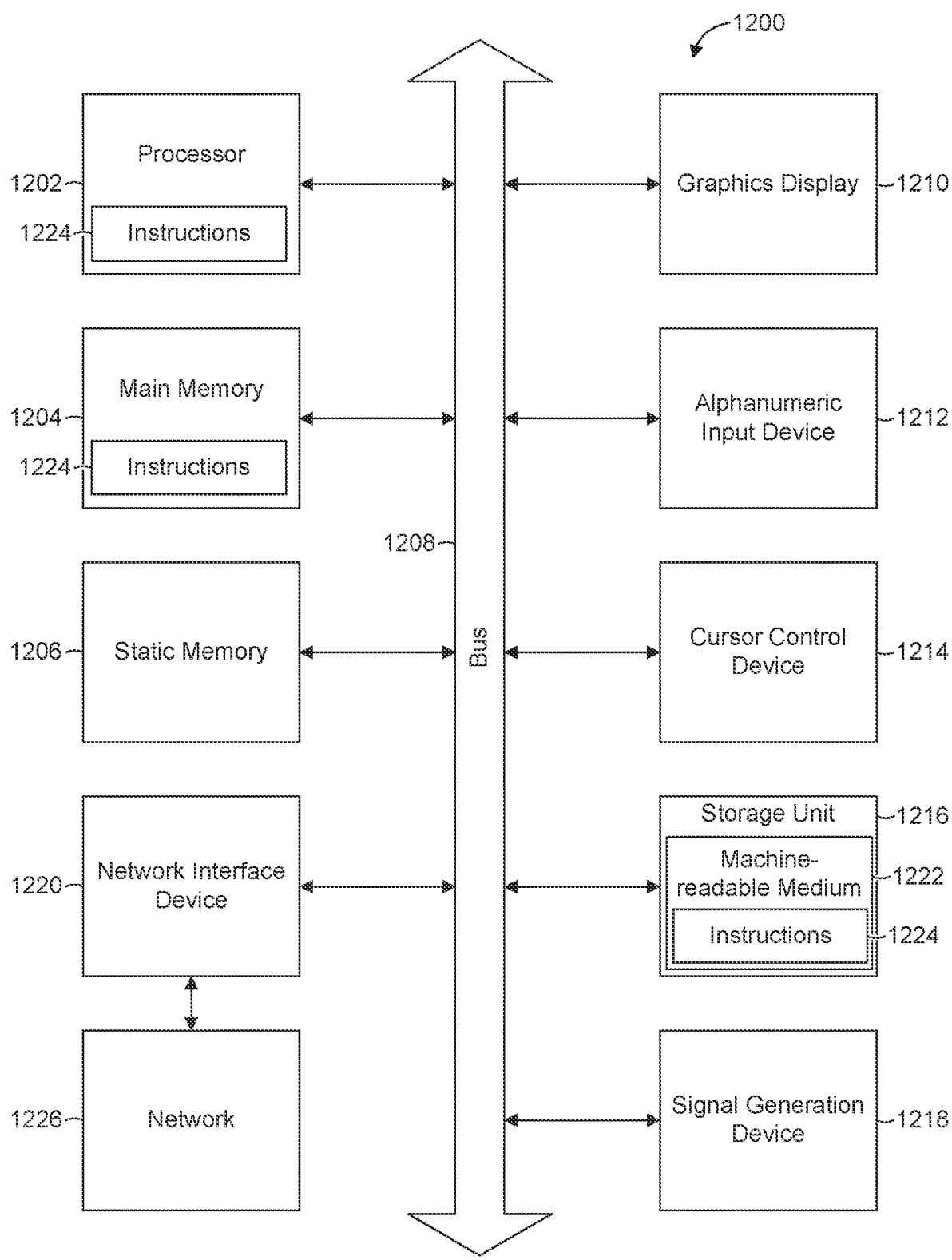
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a STB, a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which are stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 190 or network 192) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

In a first example embodiment, a media device is further defined by including the following additional features:
  the app-sync indicator includes a URL that locates supplemental content that corresponds to the media content;
  the synchronization module configures the processor to extract the URL from the app-sync indicator;
  the launch instruction includes the URL extracted from the app-sync indicator; and
  the companion device launches the application with the URL as an input to the application.

In a second example embodiment, the media device of the preceding description is further defined by including the following additional feature:
  the synchronization module configures the processor to determine, prior to sending the launch instruction to the companion device, that the URL is referenced by a list of trusted URLs.

In a third example embodiment, the media device of any of the above descriptions is further defined by including the following additional features:
  the app-sync indicator and the launch instruction identify the application among multiple applications stored by the companion device;
  the synchronization module configures the processor to send the launch instruction based on the app-sync indicator identifying the application; and
  the companion device launches the application based on the launch instruction identifying the application.

In a fourth example embodiment, the media device of the preceding description is further defined by including the following additional feature:
  the synchronization module configures the processor to determine, prior to sending the launch instruction to the companion device, that the application is referenced by a list of trusted applications.

In a fifth example embodiment, the media device of any of the above descriptions is further defined by including the following additional features:
  the app-sync indicator includes a reference to supplemental content for the media content;
  the synchronization module configures the processor to extract the reference to the supplemental content from the app-sync indicator;
  the launch instruction includes the reference to the supplemental content; and
  the companion device, in launching the application, causes the application to obtain and store the supplemental content on the companion device.

In a sixth example embodiment, the media device of any of the above descriptions is further defined by including the following additional features:
  the app-sync indicator includes a reference to supplemental content for the media content; and
  the synchronization module configures the processor to extract the reference to the supplemental content from the app-sync indicator;
  the launch instruction includes the reference to the supplemental content; and
  the companion device, in launching the application, causes the application to initiate a presentation of the supplemental content on a screen of the companion device.

In a seventh example embodiment, the media device of the preceding description is further defined by including the following additional features:
  the reception module is configured to receive a datastream via a first network; and
  the synchronization module configures the processor to provide the supplemental content to the companion device via a second network.

In an eighth example embodiment, the media device of the sixth or seventh embodiments is further defined by including the following additional features:
  the media content depicts an event from a first camera angle; and
  the supplemental content depicts the event from a second camera angle.

In a ninth example embodiment, the media device of any of the sixth, seventh, or eighth embodiments is further defined by including the following additional feature:
  the synchronization module configures the processor to present, prior to sending the launch instruction to the companion device, a suggestion that the companion device present the supplemental content.

In a tenth example embodiment, the media device of the preceding description is further defined by including the following additional feature:
  the synchronization module configures the processor to present the suggestion on the display and receives an acceptance of the suggestion from a remote control configured to control the media device.

In an eleventh example embodiment, the media device of the ninth embodiment is further defined by including the following additional feature:
  the synchronization module configures the processor to present the suggestion by causing the companion device to present the suggestion on a screen of the companion device.

In a twelfth example embodiment, the media device of the preceding description is further defined by including the following additional feature:

the synchronization module configures the processor to receive an acceptance of the suggestion from the companion device.

In a thirteenth example embodiment, the media device of any of the above descriptions is further defined by including the following additional feature:

the suggestion is a single icon that indicates an availability of the supplemental content for presentation and identifies a button that is operable to submit the acceptance of the suggestion.

In a fourteenth example embodiment, the media device of any of the above descriptions is further defined by including the following additional feature:

a detection module configured to present, prior to the sending of the launch instruction to the companion device, a menu of detected companion devices on the display and receive a selection that indicates the companion device is selected from the presented menu.

In a fifteenth example embodiment, the media device of any of the above descriptions is further defined by including the following additional feature:

the detection module is configured to establish, prior to sending the launch instruction to the companion device, a communication link with the companion device based on the companion device being brought within a threshold distance of the media device.

In a sixteenth example embodiment, the media device of the preceding description is further defined by including the following additional feature:

the detection module is configured to determine, prior to establishing the communication link with the companion device, that the companion device is referenced by a list of trusted companion devices.

In a seventeenth example embodiment, the media device of any of above descriptions is further defined by including the following additional feature:

the media device is inadequate to execute the application.

In an eighteenth example embodiment, the companion device includes the following components:

an access module configured to receive a launch instruction sent based on an app-sync indicator provided contemporaneously with media content within a datastream received by a media device that sent the launch instruction; and a processor configured by a companion module to launch an application in response to the launch instruction sent from the media device based on the app-sync indicator provided contemporaneously with the media content within the datastream received by the media device.

In a nineteenth example embodiment, the companion device of the preceding description is further defined by including the following additional feature:

the access module is configured to receive the application from the media device prior to the launching of the application in response the launch instruction sent from the media device.

In a twentieth example embodiment, the companion device of the eighteenth or nineteenth embodiment is further defined by including the following additional features:

the app-sync indicator includes a URL that locates supplemental content that corresponds to the media content;
the media device is configured to extract the URL from the app-sync indicator;

the launch instruction includes the URL extracted from the app-sync indicator; and the companion module configures the processor to launch the application with the URL as an input to the application.

In a twenty-first example embodiment, the companion device of any of the eighteenth, nineteenth, or twentieth embodiments is further defined by including the following additional features:

the app-sync indicator and the launch instruction identify the application among multiple applications stored by the companion device;

the media device sent the launch instruction based on the app-sync indicator identifying the application; and the companion device launches the application based on the launch instruction identifying the application.

In a twenty-second example embodiment, the companion device of any of the above companion device descriptions is further defined by including the following additional features:

the app-sync indicator includes a reference to supplemental content for the media content;

the media device is configured to extract the reference to the supplemental content from the app-sync indicator;

the launch instruction includes the reference to the supplemental content; and the companion module configures the processor, in launching the application, to cause the application to obtain and store the supplemental content on the companion device.

In a twenty-third example embodiment, the companion device of any of the above companion device descriptions is further defined by including the following additional features:

the app-sync indicator includes a reference to supplemental content for the media content;

the media device is configured to extract the reference to the supplemental content from the app-sync indicator;

the launch instruction includes the reference to the supplemental content; and the companion module configures the processor, in launching the application, to cause the application to initiate a presentation of the supplemental content on a screen of the companion device.

In a twenty-fourth example embodiment, the companion device of the preceding description is further defined by including the following additional features:

a network-based media system provides the datastream to the media device via a first network; and the access module is configured to receive the supplemental content via a second network.

In a twenty-fifth example embodiment, the companion device of the twenty-third or twenty-fourth embodiment is further defined by including the following additional features:

the media content depicts an event from a first camera angle; and the supplemental content depicts the event from a second camera angle.

In a twenty-sixth example embodiment, the companion device of any of the above companion device descriptions is further defined by including the following additional feature:

the companion module configures the processor to present a suggestion on a screen of the companion device that the supplemental content be shown on the screen.

In a twenty-seventh example embodiment, the companion device of the preceding description is further defined by including the following additional feature:

the companion module configures the processor to detect an acceptance of the suggestion presented on the screen.

In a twenty-eighth example embodiment, the companion device of any of the above companion device descriptions is further defined by including the following additional feature:

a detection module configured to present, prior to the receiving of the launch instruction, a menu of detected companion devices on a screen of the companion device, the companion device being listed in the menu.

In a twenty-ninth example embodiment, the companion device of the preceding description is further defined by including the following additional feature:

the detection module is configured to receive a selection that indicates the companion device is selected from the presented menu.

In a thirtieth example embodiment, the companion device of the twenty-eighth or twenty-ninth embodiment is further defined by including the following additional feature:

the detection module is configured to establish a communication link with the media device based on the media device being brought within a threshold distance of the companion device.

In a thirty-first example embodiment, the companion device of the preceding description is further defined by including the following additional feature:

the detection module, prior to establishing the communication link with the media device, determines that the media device is referenced by a list of trusted media devices.

In a thirty-second example embodiment, the companion device of any of the above companion device descriptions is further defined by including the following additional feature:

the media device is inadequate to execute the application.

In a thirty-third example embodiment, a media device includes the following components:

a reception module configured to access a datastream that includes media content and an app-sync indicator associated with the media content;

a presentation module configured to cause presentation (e.g., display) of the media content on a display (e.g., display device);

detection module configured to detect a companion device in physical proximity to the media device (e.g., to the detection module); and a processor configured by a synchronization module to send, to the companion device, a launch instruction to cause launching of an application corresponding to the app-sync indicator on the companion device, the launch instruction being sent contemporaneously with the presentation (e.g., display) of the media content on the display (e.g., display device).

What is claimed is:

1. A method comprising:

accessing, by a first device that corresponds to a first display, an instruction generated by a second device that identified an application among a set of applications based on information that corresponds to the application and corresponds to first content presented by a second display that corresponds to the second device; and causing, by the first device, the identified application to access second content that corresponds to the first content presented by the second display and to initiate presentation of the second content by the first display that corresponds to the first device.

2. The method of claim 1, wherein:

the accessing, by the first device, of the instruction generated by the second device is responsive to the first device performing at least one of:

a detection that the second device is within physical proximity of the first device, a determination that the second device is included in a set of trusted devices, or an establishment of a communication link with the second device based on at least one of the detection that the second device is within physical proximity of the first device or the determination that the second device is included in the set of trusted devices.

3. The method of claim 1, wherein:

the accessing, by the first device, of the instruction generated by the second device is responsive to the second device performing at least one of:

a detection that the first device is within physical proximity of the second device, a determination that the first device is included in a set of trusted devices, or an establishment of a communication link with the first device based on at least one of the detection that the first device is within physical proximity of the second device or the determination that the first device is included in the set of trusted devices.

4. The method of claim 3, wherein:

the detection that the first device is within physical proximity of the second device is performed by detecting that the first device is within a threshold distance of the second device.

5. The method of claim 3, wherein:

the detection that the first device is within physical proximity of the second device is based on at least one of an infrared signal, a wireless networking connection, or geolocation data.

6. The method of claim 3, wherein:

the establishment of the communication link with the first device includes establishment of at least one of an infrared communication link or a wireless networking link.

7. The method of claim 1, wherein:

the causing of the identified application to access the second content includes initiating execution of the identified application in response to the instruction generated by the second device; and the instruction generated by the second device specifies the application and instructs that the execution of the specified application be initiated.

8. The method of claim 1, wherein:

the instruction generated by the second device specifies the application and instructs that the second content be accessed by the specified application.

9. The method of claim 1, wherein:

the information that corresponds to the application and to the first content specifies the application and specifies the second content to be accessed by the application.

10. The method of claim 1, wherein:

the information that corresponds to the application and to the first content includes at least one of an identifier of the application or a uniform resource identifier of the second content to be accessed by the application.

11. The method of claim 1, wherein:
the information that corresponds to the application and to the first content specifies the second content to be accessed by the application, the second content including at least one of participant data of the first content or video data of an alternative view of the first content.

12. The method of claim 1, further comprising:
obtaining, by the first device, the application from the second device; and
storing, by the first device, the application among the set of applications.

13. The method of claim 1, further comprising:
causing, by the first device, the first display to present a suggestion that the second content that corresponds to the first content be presented on the first display; and
detecting, by the first device, acceptance of the suggestion that the second content be presented on the first display.

14. The method of claim 13, wherein:
the causing of the first display to present the suggestion is responsive to the first device receiving a prompt generated by the second device to present the suggestion that the second content be presented on the first display.

15. The method of claim 1, wherein:
causing, by the first device, the first display to present a suggestion that a presentation of the second content that corresponds to the first content be initiated by the first device; and
detecting, by the first device, acceptance of the suggestion that the presentation of the second content be initiated by the first device.

16. The method of claim 15, wherein:
the causing of the first display to present the suggestion is responsive to the first device receiving a prompt generated by the second device to present the suggestion that the presentation of the second content be initiated by the first device.

17. A first device comprising:
an interface communicatively coupled to a first display;
one or more processors; and
a memory storing instructions that, when executed by at least one processor among the one or more processors, cause the at least one processor to perform operations comprising:
accessing an instruction generated by a second device that identified an application among a set of applications based on information that corresponds to the application and corresponds to first content presented by a second display that corresponds to the second device; and
causing the identified application to access second content that corresponds to the first content presented by the second display and to initiate presentation of the second content by the first display communicatively coupled to the interface.

18. The first device of claim 17, wherein:
the accessing of the instruction generated by the second device is responsive to at least one of:
a detection, by the first device, that the second device is within physical proximity of the first device,
a determination, by the first device, that the second device is included in a set of trusted devices, or
an establishment, by the first device, of a communication link with the second device based on at least one of the detection that the second device is within physical proximity of the first device or the determination that the second device is included in the set of trusted devices.

19. A system comprising:
an interface communicatively coupled to a first display;
one or more processors; and
a memory storing instructions that, when executed by at least one processor among the one or more processors, cause the system to perform operations comprising:
accessing an instruction generated by a device that identified an application among a set of applications based on information that corresponds to the application and corresponds to first content presented by a second display that corresponds to the device; and
causing the identified application to access second content that corresponds to the first content presented by the second display and to initiate presentation of the second content by the first display communicatively coupled to the interface.

20. The system of claim 19, wherein:
the accessing of the instruction generated by the device is responsive to at least one of:
a detection that the device is within physical proximity of the system,
a determination that the device is included in a set of trusted devices, or
an establishment of a communication link with the device based on at least one of the detection that the device is within physical proximity of the system or the determination that the device is included in the set of trusted devices.

* * * * *